(12) United States Patent
Dry

(10) Patent No.: US 7,811,666 B2
(45) Date of Patent: Oct. 12, 2010

(54) MULTIPLE FUNCTION, SELF-REPAIRING COMPOSITES WITH SPECIAL ADHESIVES

(76) Inventor: Carolyn Dry, 1324 Sky Line Dr., Winona, MN (US) 55984

( * ) Notice: Subject to any disclaimer, the term of this patent is extended or adjusted under 35 U.S.C. 154(b) by 1104 days.

(21) Appl. No.: 11/428,132

(22) Filed: Jun. 30, 2006

(65) Prior Publication Data

US 2007/0087198 A1    Apr. 19, 2007

Related U.S. Application Data

(60) Provisional application No. 60/695,548, filed on Jul. 1, 2005.

(51) Int. Cl.
*B32B 9/00* (2006.01)
*D01F 9/12* (2006.01)
(52) U.S. Cl. .......... 428/408; 428/358; 428/364; 428/370; 428/396; 264/430; 264/434; 264/29.2
(58) Field of Classification Search .......... 106/711, 106/677, 676, 705, 708, 717, 724, 728, 802, 106/806, 815; 428/408, 357, 358, 364, 402, 428/366, 370, 374, 377, 378, 396
See application file for complete search history.

(56) References Cited

U.S. PATENT DOCUMENTS

| | | |
|---|---|---|
| 1,959,460 A | 5/1934 | Crossan |
| 2,782,829 A | 2/1957 | Peterson et al. |
| 2,877,819 A | 3/1959 | Gibbs |
| 3,069,288 A | 12/1962 | Oxx et al. |
| 3,179,600 A | 4/1965 | Brockett |
| 3,274,401 A | 9/1966 | Landers |
| 3,423,491 A | 1/1969 | Mahon et al. |
| 3,475,188 A | 10/1969 | Woodhouse et al. |
| 3,503,783 A | 3/1970 | Evans |
| 3,505,244 A | 4/1970 | Cessna |
| 3,607,591 A | 9/1971 | Hansen |
| 3,647,557 A | 3/1972 | Kegelman |
| 3,704,264 A | 11/1972 | Gorman |
| 3,803,485 A | 4/1974 | Crites et al. |
| 3,913,666 A | 10/1975 | Bayliss |

(Continued)

FOREIGN PATENT DOCUMENTS

CA    1166135    4/1984

(Continued)

OTHER PUBLICATIONS

Kessler et al., Self-healing sructural composite materials, No month 2003, Composites: Part A, 34, pp. 743-753.*

(Continued)

*Primary Examiner*—Timothy M Speer

(57) ABSTRACT

A system for self-repairing matrices such as concrete or cementitous matrices, polymeric matrices, and/or fibrous matrices, including laminates thereof. The system includes repair agents retained in and/or on vessels, such as hollow fibers, within the matrix. Upon impact, the vessel rupture, releasing the chemicals. For multi-layer laminates, the systems provides a total dynamic energetic circulation system that functions as an in situ fluidic system in at least one layer or area. The energy from the impact ruptures the vessels to release the chemical(s), and mixes the chemical(s) and pushes the chemical(s) and/or resulting compound through the matrix. The repair agents can withstand high temperatures, such as the heat of processing of many laminates, e.g., 250-350° F.

53 Claims, 6 Drawing Sheets

U.S. PATENT DOCUMENTS

| | | | |
|---|---|---|---|
| 4,086,386 A | 4/1978 | Gaworowski et al. | |
| 4,109,033 A | 8/1978 | Blankenhorn et al. | |
| 4,183,890 A | 1/1980 | Bollinger | |
| 4,272,898 A | 6/1981 | Tansill | |
| 4,286,643 A | 9/1981 | Chemizard et al. | |
| 4,504,402 A | 3/1985 | Chen et al. | |
| 4,505,953 A | 3/1985 | Chen et al. | |
| 4,513,053 A | 4/1985 | Chen et al. | |
| 4,587,279 A | 5/1986 | Salyer et al. | |
| 4,733,989 A | 3/1988 | Harriett | |
| 4,780,205 A | 10/1988 | Murakami et al. | |
| 4,810,573 A | 3/1989 | Harriett | |
| 4,851,291 A | 7/1989 | Vigo et al. | |
| 4,908,238 A | 3/1990 | Vigo et al. | |
| 4,919,183 A | 4/1990 | Dobson | |
| 4,961,790 A | 10/1990 | Smith et al. | |
| 4,978,563 A | 12/1990 | Sandels | |
| 5,232,769 A | 8/1993 | Yamato et al. | |
| 5,530,037 A | 6/1996 | McDonnell et al. | |
| 5,534,289 A * | 7/1996 | Bilder et al. | 427/8 |
| 5,538,735 A | 7/1996 | Ahn | |
| 5,561,173 A | 10/1996 | Dry | |
| 5,575,841 A | 11/1996 | Dry | |
| 5,660,624 A | 8/1997 | Dry | |
| 5,803,963 A | 9/1998 | Dry | |
| 5,965,266 A | 10/1999 | Goujard et al. | |
| 5,989,334 A | 11/1999 | Dry | |
| 6,075,072 A | 6/2000 | Guilbert et al. | |
| 6,257,849 B1 | 7/2001 | Wu | |
| 6,261,360 B1 | 7/2001 | Dry | |
| 6,478,913 B1 | 11/2002 | Dunleavy et al. | |
| 6,518,330 B2 | 2/2003 | White et al. | |
| 6,527,849 B2 | 3/2003 | Dry | |
| 6,579,636 B2 | 6/2003 | Oguri et al. | |
| 6,579,827 B2 | 6/2003 | Suzuki | |
| 6,642,337 B1 | 11/2003 | Misiak et al. | |
| 6,653,151 B2 | 11/2003 | Anderson et al. | |
| 6,746,984 B2 | 6/2004 | Suzuki et al. | |
| 6,750,272 B2 | 6/2004 | Kessler et al. | |
| 6,766,817 B2 | 7/2004 | da Silva | |
| 6,794,472 B2 | 9/2004 | Harris et al. | |
| 6,808,461 B2 | 10/2004 | Harris et al. | |
| 6,858,660 B1 | 2/2005 | Scheifers et al. | |
| 6,890,561 B1 | 5/2005 | Blatt et al. | |
| 6,918,404 B2 | 7/2005 | da Silva | |
| 7,022,179 B1 | 4/2006 | Dry | |
| 7,066,586 B2 | 6/2006 | da Silva | |
| 7,108,914 B2 | 9/2006 | Skipor et al. | |
| 7,157,102 B1 | 1/2007 | Nuwayser | |
| 7,192,993 B1 | 3/2007 | Sarangapani et al. | |
| 7,342,057 B2 | 3/2008 | Kumar et al. | |
| 2001/0016259 A1* | 8/2001 | Campbell et al. | 428/375 |
| 2002/0191923 A1* | 12/2002 | Priest et al. | 385/109 |
| 2003/0013551 A1 | 1/2003 | Harris et al. | |
| 2003/0032758 A1 | 2/2003 | Harris et al. | |
| 2003/0119398 A1 | 6/2003 | Bogdanovich et al. | |
| 2003/0155058 A1 | 8/2003 | Saito | |
| 2004/0007784 A1 | 1/2004 | Skipor et al. | |
| 2004/0055686 A1 | 3/2004 | Cowger | |
| 2004/0226620 A1 | 11/2004 | Therriault et al. | |
| 2005/0027078 A1 | 2/2005 | Scheifers et al. | |
| 2005/0250878 A1 | 11/2005 | Moore et al. | |
| 2006/0042504 A1 | 3/2006 | Kumar et al. | |
| 2007/0003631 A1 | 1/2007 | Sayre et al. | |

FOREIGN PATENT DOCUMENTS

| | | |
|---|---|---|
| DE | 3821785 | 1/1990 |
| EP | 0107086 A2 | 5/1984 |
| JP | 58-005529 | 1/1983 |
| JP | 58-013227 | 1/1983 |
| JP | 58-013229 | 1/1983 |
| JP | 01-108262 | 4/1989 |
| JP | 01-113436 | 5/1989 |
| JP | 02-145383 | 6/1990 |
| WO | WO2005/077856 | 8/2005 |
| WO | WO2007/005657 | 1/2007 |

OTHER PUBLICATIONS

Amoto, Ivan, Science. Jan. 17, 1992, vol. 255, No. 5042, pp. 284-286.

Dry, C. M., "Building Material Which Evolve and Adapt Over Time-Use of Encapsulation Technology," Proceedings of the ARCC Research Conference 1988, School of Architecture, Univ. Ill., Nov. 13-15, 1988.

Dry, C. M., Quality For Building Users Trougout [sic] the World. Jun. 19, 1989, pp. 391-399.

Dry, C. M. Doctoral Dissertation, Virginia Polytechnic Institute, Jan. 1991.

Dry, C. Materials Research Society Symposium Proceedings, 1992, vol. 276, pp. 311-314.

Dry, C. International Journal of Modern Physics B. 1992, vol. 6, Nos. 15 & 16, pp. 2763-2771.

Dry, C. et al. The International Society for Optical Engineering, 1993, vol. 1916, pp. 438-444.

Dry, C. Journal of Intelligent Material Systems and Structures, Jul. 1993, vol. 4, No. 3, pp. 420-425.

Dry, C. Journal of Smart Materials and Structure, 1994, vol. 3, pp. 118-123.

Elmer's, Material Safety Data Sheet, http:/www.elmers.com/products/msds/me375_c.htm, Oct. 22, 2008.

Geishauser, C.B. et al., Cement and Concrete Research, 1977, vol. 7, pp. 85-94.

Kistler, C.W. et al. National Technical Information Service. "Internal Sealing of Concrete With Degradable Polymer Beads", Aug. 1983.

Kosmatka, Steven, et al. Portland Cement Association, Design & Control of Concrete Mixtures. 1988, Thirteenth Ed. pp. 64-65.

Kroner, W., et al. Proceedings of the 3rd International Congree on Building Energy Management, Lucerne, Switzerland, Sep. 28-Oct. 2, 1987, pp. 101-108.

Motuku M., et al., Journal of Smart Material and Structure, 1999, vol. 8, pp. 623-638.

Therriault, D. et al., Nature Materials, Chaotic mixing in three-dimensional microvascular networks fabricated by direct-write assembly, Mar. 23, 2003.

Time Magazine, "Capsule Solution for Countless Problems," Apr. 8, 1966, p. 70.

Vigo, T.L. et al. Journal of Coated Fabrics, Apr. 1983, vol. 12, pp. 243-254.

International Search Report dated Oct. 2, 2007.

Hansmann, 2003, "*Composites.*" Oct. 2003.

Brown et al., 2002, Experimental Mechanics., vol. 42, No. 4, pp. 372-379 "*Fracture testing of a self-healing polymer composite.*" Dec. 2002.

* cited by examiner

FIG. 9
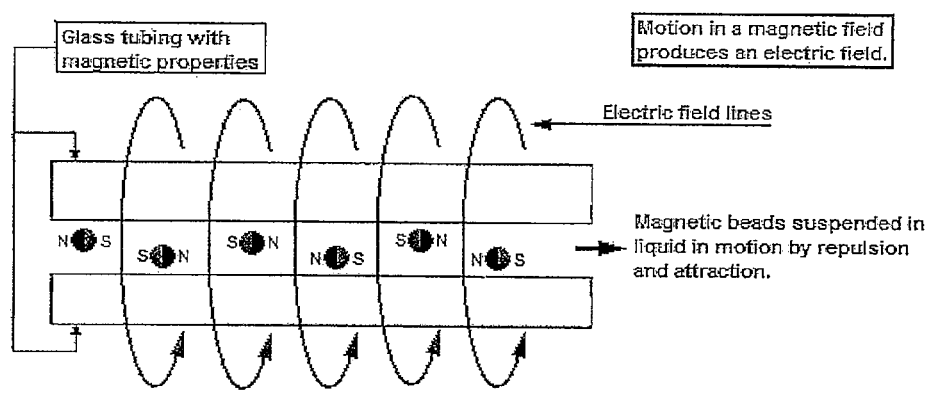
FIG. 10 A
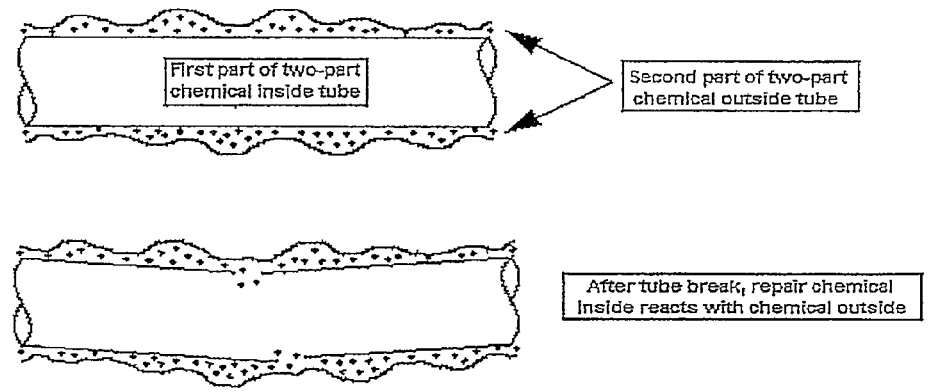
FIG. 10 B

MULTIPLE FUNCTION, SELF-REPAIRING COMPOSITES WITH SPECIAL ADHESIVES

This application claims the benefit of U.S. Provisional Patent Application Ser. No. 60/695,548, filed Jul. 1, 2005, entitled Systems for Self Repair & Adhesives for Self Repair of Composites. Application No. 60/695,548 is incorporated herein by reference in its entirety.

BACKGROUND OF THE INVENTION

The present invention generally relates to matrix materials for use in a wide variety of end use fields and applications. More particularly, the invention relates to self-repairing, settable or curable matrix material systems, containing reactive chemicals used in conjunction with release vessels or conduits such as fibers, the functions of which may be multiple.

Composites include at least two materials: the matrix and inclusions, such as reinforcement fibers or particles. Failures often occur at the interfaces between the matrix and fibers or particles. To prevent failure and fatigue, good bonding between the materials is needed. Numerous systems and techniques for repairing failed composites have been proposed.

Dry, a former professor at the University of Illinois, in several patents the invention for which she conceived and developed independently by 1990, e.g., U.S. Pat. Nos. 6,261, 360, 5,989,334, 5,660,624, 5,575,841, and 5,561,173, described a cured matrix having a plurality of hollow release vessels, usually fibers, dispersed therein, the hollow fibers having a selectively releasable modifying agent contained therein, means for maintaining the modifying agent within the fibers until selectively released, and means for permitting selective release of the modifying agent from the hollow fibers into the matrix material in response to at least one predetermined external stimulus. The cured matrix materials have within them smart fibers capable of delivering repair agents into the matrix wherever and whenever they are needed.

In Dry's patents discussed above, damage was repaired by fibers containing modifying agent. Dry found that fibers, for retaining the chemical modifying agent, were easier to break than beads, they could cover damage which occurred over a larger area, could preserve strength of the structure, could act as a reservoir to retain larger volumes of agent therein than beads and, if the ends protruded, more chemical could be added.

Another researcher group, Professors Sottos, White and Moore at the University of Illinois, has made various attempts to provide self-healing composites starting in 1993, nearly 4 years after Dry's initial work. One design was to use a fairly expensive active chemical, such as dicyclopentadiene (DCPD) or Grubbs ruthenium in the matrix with dicyclopentadiene (DCPD) in beads. See, for example, U.S. Pat. No. 6,518,330. This approach, using very small beads and such a living chemical system, was designed to not require much force of damage but instead relied on small forces and predict a an automatic full reaction to pull the chemical out of the bead beads once the reaction has started. An article in Nature magazine by White, S., Sottos, N., et al., Autonomic Healing Polymer Composites, Feb. 15, 2001 describes this. However, the research group later discovered that the Grubbs ruthenium ruins the polymer matrix as described in. Their solution was to encapsulate the ruthenium; see U.S. Patent Publication No. 2005/0250878 A1, entitled "Wax particles for protection of activators, and multifunctional autonomically healing composite materials". Their solution was to encapsulate the Grubbs ruthenium in wax in the matrix.

Subsequently, an elaborate system, called microfluidics, was developed by this group at the University of Illinois that included forming multiple layers of tubes, from a solidified ink which is then coated and the ink removed based on an ink developed at Sandia labs. The system includes in the matrix, a pump, valves in tubes to control chemical flow, and mixing towers to provide among other capabilities, composites with self-repair properties. See, for example, U.S. Patent Publication No. 2004/0226620 "Microcapillary networks". See also, for example, FIG. 10, which schematically illustrates the self-repairing system with microfluidic aspects developed by University of Illinois. It requires a separate form piece for all the functions such as mixing towers, delivery tubes in all or most layers, a pump and valves to start and stop the flow in the tubes. The valves could be operated based on pH, and suggestions by others have been made to use light to modulate the valves.

U.S. Pat. No. 5,803,963 to Dry describes a self forming composite with an ongoing chemical reaction in which one chemical is released from a fiber into a mold containing two powders and that chemical reacts with one powder in the mold and in that reaction, a product is produced which reacts with the other powder in the mold. A polymer ceramic can be made in this way or other self forming composites.

U.S. Pat. No. 6,750,272, described a method for making a fiber-reinforced composite, the method including dispensing a reactive liquid into a mold, with the mold including fibers and a single-component activator on the fibers.

U.S. Patent Publication No. 2004/0007784 to Skipor et al., who worked with the White group at University of Illinois, describes a self-healing polymer composition containing a polymer media and a plurality of microcapsules or beads of flowable polymerizable material dispersed in the polymer media, where the microcapsules of flowable polymerizable material contain a flowable polymerizable material and have an outer surface upon which at least one polymerization agent is attached. The microcapsules supposedly are effective for rupturing with a failure of the polymeric media, and the flowable polymerizable material reacts with the polymerization agent when the polymerizable material makes contact with the polymerization agent upon rupture of the microcapsules. This is described as a way of making an initial cured form.

U.S. Pat. No. 6,858,660 to Scheifers et al. described a self-joining polymer composition, comprising a polymer, a plurality of amine pendant groups attached to the polymer and a plurality of microcapsules of flowable polymerizable material dispersed in the polymer where the microcapsules of flowable polymerizable material including microcapsules and flowable polymerizable material inside the microcapsules. The microcapsules are effective for rupturing with a failure of the polymer so the flowable polymerizable material cross-links with the reactable pendant groups upon rupture of the microcapsules.

Different techniques for formation of a composite structure are discussed in U.S. Patent Publication No. 2003/0119398 to Bogdanovich et al., where a resin distribution system and method for use in resin transfer molding includes using a 3-D orthogonal fiber structure having small channels therein for permitting a fluid to flow through the structure for formation of cured composites for use in such processes as resin transfer molding. The 3-D orthogonal fiber structure includes a woven system, having X-, Y-, and Z-direction fiber, each of having substantially no crimp within a body of the structure, thereby providing a system for distributing the fluid uniformly through the structure.

Other attempts have been made to provide self-repairing composites by other groups which used release from hollow fibers. See, for example, Motuku et al., from the University of Alabama, in "Parametric Studies on Self-Repairing Approaches for Resin Infused Composites Subjected to Low Velocity Impact", Smart Material Structure 8 (1999) 623-638, studied low velocity impact response of glass fiber reinforced composites, which supposedly had the potential to self-repair both micro- and macro-damage. This University of Alabama group researched low velocity impacts for self-repair in fiberglass composites which were prepared at a fairly low temperature, sufficient to make fiberglass samples. Their studies focused on a two part system which needed, in general, mixing of more than one minute.

In the U.K., Bristol University researchers Ian Bond and Richard Trask used psuedoimpact and then heat to release and heat to cure self-repair agents in glass tube mats placed on or in composites, the technology suitable for use in a space environment. Still other tactics are described, for example, in "Bleeding Composites'—Damage Detection and Self-Repair using a Biomimetic Approach", Pang et al., Composites: Part A 36 (2005) 183-1888.

Various matrix materials without separate chemical release inclusions, which are said to have self repairing properties, have been developed by numerous researchers; for example, studies have been ongoing by Professor Wutl of UCLA, at VPI and SU (Virginia Polytechnic Institute and State University), and at NASA Langely. Some of these developed systems are designed to reversibly repair damaged composites, but the materials are generally not strong enough for structural applications. One shortcoming is that many of the systems need heat to trigger the self-repair chemistry. Prof. Wutl suggests applications such as the glass in car headlights or heated windshields, where a heat source is readily available, for use of the self-repair system. The NASA system is used for ballistic damage where heat may be produced.

The subject of self-repairing composite materials not only includes concretes and polymeric materials, in addition to headlights and windshields, it has been suggested that housings and other parts of cell phones, computers and perhaps batteries could be made self-repairing. See, e.g., U.S. Patent Publication No. 2005/0027078 to Scheifers et al., which used chemistry to repair low energy damage such as in computer casings or cell phones by use of reactions which are self perpetuating. Other suggested self-repairing products include golf balls and tires.

The ideas for self-repairing composites are now widespread, but processing of the products under heat, development of adequate repair chemicals in terms of heat resistance, speed of repair, and simple systems which use an in-situ system of energy and chemical flow in a circulation system to repair well, systems to repair medium to high impact damage, multi-use applications, and applications to new end uses are all areas needing solutions and invention.

SUMMARY

The present invention provides alternate designs and/or solutions to most of the drawbacks encountered in the prior art. The disclosure provides processing of the products under heat, development of adequate repair chemicals in terms of heat resistance, speed of repair, and simple in-situ systems which use the an in situ system of energy and chemical flow in a circulation system to repair well, systems to repair medium to high impact damage, fatigue damage, as well as self forming/self repairing composites as well as other multiple functional or multi-use applications. In the simplest form, in order to be self-repairing, a special, and applications to new end uses are all areas needing solutions and invention.

The present disclosure provides various elements, such as different and better repair conduits, alternate constructions for the repair conduits, alternate manners of having the repair conduits (e.g., fibers or channels), different and better modifying agent is stored in a conduit embedded in a matrix. When the resulting composite is damaged, the damage progresses through the composite matrix, breaking the conduit and releasing the modifying agent. The modifying agent flows into the crack and re-bonds the cracked or delaminated faces.

An opportunistic dynamic notion of materials is included in this approach of self-repairing materials, in that it can go beyond self-repair, from changing and problem solving into new totally dynamic structures in terms of their energy, design for material flow, and chemical change of the materials. The self-repairing composites of this disclosure utilize a system of liquid flows, energy applications and response, and chemical reactions, all in a synchronized way. The energy in the circulation system may come from any of the aspects involved such as the force or damage, the repair conduit, a coating on the repair conduit, the modifying agent (which can be present in several parts and/or in several locations of the system), inclusions in the matrix such as beads or particles, the matrix itself, and the interactions of various factors such as flow, energy produced by flow, damage and material properties.

The present disclosure is to a composite matrix, including polymer composite laminates, having a plurality of hollow repair conduits dispersed therein, a modifying agent present within the repair conduits and/or thereon, and means for permitting selective release of the modifying agent from the repair conduits into the matrix material in response to at least one external stimulus. Two examples of repair conduits are hollow repair fibers and channels. In most embodiments, reinforcing fibers are also present throughout the matrix. The matrix and the repair conduits together form an in situ fluidic system that transports the modifying agent(s) throughout the matrix.

In many embodiments, the matrix, including the modifying agent and repair fibers, is particularly suited for use in or processing under high temperature applications, e.g., at least 250° F., often 250-350° F., for extended periods of time, such as 1-3 hours. In many of these embodiments, the modifying agent is sufficiently heat stable to withstand the high temperatures. In embodiments where the stability of the modifying agent under high temperatures is questionable, the modifying agent can be put into the fiber after the high temperature processing. In most embodiments, the resulting article can withstand heat of use of the article and can also withstand any heat generated in the article during use.

Additionally or alternatively, the cured matrix is particularly suited to be a layer in a laminate material, e.g., a material having at least one self-repairing layer. The cured matrix is particularly suited for use with graphite and fiberglass laminates, which typically have to be processed at high temperatures.

The modifying agent may be present within the repair conduits (e.g., within the hollow repair filter) on a surface of fibers, or both. Additionally, other modifying agents, either the same or different than the first modifying agent, may be present at locations other than the repair conduits, for example, distributed throughout the matrix. In some embodiments, the modifying agent(s) may be encapsulated or beaded.

The repair conduits may be present as randomly dispersed conduits through the matrix or may be positioned in an orderly manner as in a layer of a laminate. In some embodiments, the ends of the repair conduits are engulfed or otherwise retained in the matrix, or the ends may extend out to the edges of the matrix for later refilling if needed. Generally, the ends of the repair conduits are sealed in the final composite, to retain the modifying agent therein. For embodiments where the repair conduits are fibers, the ends are typically sealed with adhesives, heat or other manner.

In some embodiments, especially those where the resulting composite is a layer in a laminate, the reinforcing fibers, if present, can be provided as an orderly network of fibers. The reinforcing fibers could be present as a dense woven or knitted mat, or be present as a lofty non-woven mat. In other embodiments, whether in a laminate or not, the reinforcing fibers could be randomly dispersed throughout the matrix.

The present disclosure, in its most basic form, is directed to self-repairing systems that retain a modifying agent until needed. The systems include a matrix having a plurality of hollow repair conduits dispersed therein, a modifying agent present, at least, within the repair conduits and/or thereon. Upon a predetermined stimulus, the modifying agent is released from the repair conduits into the matrix material. The matrix and the repair conduits together form an in situ fluidic system that transports the modifying agent(s) throughout the matrix. In many embodiments, the matrix, including the modifying agent and repair conduit, is particularly suited for use in or processing under high temperature applications, e.g., at least 250° F., often 250-350° F., for extended periods of time, such as 1-3 hours.

One particular aspect of this disclosure is a self-repair system having a modifying agent present in a conduit. The modifying agent can be a one-part system or a two-part system; for a two-part system, typically only one part is retained in the conduit, or, the second part is retained in a second conduit. The conduit is configured to retain the modifying agent until appropriate external stimulus, at which time the modifying agent is released. The modifying agent is configured to react and repair any damage within the matrix. At least the modifying agent can withstand without degradation exposure to high temperatures, e.g., at least 250° F., often 250-350° F., for extended periods of time, such as 1-3 hours.

Another particular aspect of this disclosure is a self-forming system in which conduits form a weave or 3-D structure. At least one part of the modifying agent is within the conduits, and a second part, for a two-part modifying agent, can be in or on the fiber weave or structure. Upon appropriate stimulus, the conduit releases the internally held modifying agent, which contact and react with the second part, optionally forming the matrix. This system can make composites, laminates, or pre-pregs which can be activated later. In some embodiments, the modifying agent can withstand without degradation exposure to high temperatures, e.g., at least 250° F., e.g., at least 350° F. for 1-3 hours.

An aspect of this disclosure is to provide a polymer graphite composite laminate, preferably having 24-32 single plies, in which the laminate is self-repairing, by inclusion of repair conduits with repairing modifying agent. The repair modifying agent can resist temperatures of at least 250° F. for at least one hour and in some embodiments even at least 300° F. for 2 hours, in the usual oven ramp for carbon pre-preg. Even at these temperatures for these times, the repair modifying agent remains sufficiently strong to repair the laminate after impact of 5 to 50 joules to about 70-80% of the non impacted control. This laminate may be a graphite laminate. The repair conduits may be glass tubes. The repairing agent could be an epoxy, including an epoxy vinyl ester, a vinyl ester or an acrylate, such as a cyanoacrylate. In some embodiments, the repairing agent can be modified to provide desired properties such as heat resistance, fast chemical reaction, strength, later water proofing and longer shelf life.

Another aspect of this disclosure is to provide a polymer composite laminate, e.g., having 24-32 single plies, in which the laminate is self-repairing. The laminate has conduits, such as tubes or channels, with repair modifying agent(s). The repair agent can resist heat of at least 250° F. for at least one hour and, in some embodiments, at least 300° F. for at least 2 hours. The repair agent remains strong enough to repair the laminate after impact of 5 to 50 joules to about 70-80% of the non impacted control without any repair conduits. The repair occurs in less than one hour. In some embodiments, the repair occurs in less than one minutes, or even in less than 30 seconds.

This disclosure is also directed to a chemical adhesive that has been designed to be used in a self-repairing composite system. The chemical is a modifying agent or repair agent that can resist the heat of processing of the composite, such as laminate processing conditions. In some embodiments, the heat of processing is at least 250° F. for at least one hour or at least two hours, and in other embodiments, is at least 300° F. for at least one hour or at least two hours. Even after processing of the composite, the modifying agent is preferably able to beneficially survive subsequent high temperatures, and in some embodiments, moisture (e.g., liquid water) at the surface and/or internally in the composite. In some embodiments, the modifying agent is also designed to have an extended shelf life, prior to processing of the composite, subsequent to processing, or both.

The disclosure also provides systems having conduits comprising boron materials, either as the conduits or on the wall, which can be oxidized at high temperatures in a carbon atmosphere. At very high temperatures, the boron melts, becoming flowable glass. As the melted boron is released from the conduit to repair the damaged areas, in the presence of oxygen the boron reoxidizes into a material having higher temperatures than the boron before oxidation. This step wise increase in temperature and oxidation resistance can occur several times with several different boron on boron like materials.

In another aspect of this disclosure, a chemical adhesive is provided for a laminate, the adhesive being a modifying agent that can react with more than one part of a laminate, such as atmospheric air, the conduit (or a portion thereof) retaining the modifying agent, structural materials in the laminate (e.g., graphite) or fillers or other materials in the laminate (e.g., clay, carbon black, nanotubes, moisture, cement). In some embodiments, this modifying agent is temperature resistant, e.g., at least up to 250° F. for at least one hour or at least two hours, and in other embodiments, at least up to 350° F. for at least one hour or at least two hours In still another aspect of this disclosure, two conduits are provide for retaining a two-part system, which upon reaction, self-repairs or self-forms a matrix. Each conduit contains one part of the two-part system. The conduits could be any of tubes or fibers, channels, or beads. Tubes or channels could be twisted or twinned or otherwise in close proximity to each other.

In yet another embodiment of this disclosure, exotic reactions are used for self-repair systems. Exotic reactions include those that involve ROMP (ring-opening metathesis polymerization), Bergman cyclization, Dehls Alder, Shrock chemistry, DCDP (dicyclopentadiene), Grubbs ruthenium, tin and iron.

In some embodiments, the repair modifying agent in the self-repair or self-forming system is a one-part adhesive. In other embodiments, the repair modifying agent in the self-repair or self-forming system is a two-part adhesive.

The present disclosure also provides a reactive system for a self-repair or self-forming system that is initiated with exposure to air. The reactive system includes a repair agent or modifying agent, such as urethanes, other sealants or adhesives such as esters or cyanates which may react with moisture present in the air. In some embodiments, this repair agent or modifying agent is present in a repair conduit, until released by rupture of the conduit.

In some embodiments, conduits, such as beads or tubes, may be made from reactive materials, such as many adhesives or repair chemicals listed in the ingredients list herein. The conduits may be made by putting them in a reactive substance to form a shell, and taking them out and stopping the reaction by exposure to another chemical.

Matrices that could be made with a self-forming system include polymeric matrices and cementitous matrices, for example, with hexamethylene diamine and acid such as maleic or succinic to make nylon 666 which gives off water to react with cement.

The present disclosure provides for other ways of self forming matrices. Fibers filled with a one part repair chemical can have the other part on the fiber surface and upon fiber breakage the two can react and combine and create a fiber resin matrix system. This could also be made into a pre-preg system for later activation into a composite. Additionally the self forming system can use the same not emptied fibers for later self repair of the self formed matrix.

The self forming conduits with repair chemical inside and on the surface may be present as a three dimensional (3-D) system of fibers or channels or a weave or array. Fibers may be provided as a dense woven or knitted mat, or be present as a lofty non-woven mat.

In alternate embodiments, the repair conduits may be present as a three dimensional (3-D) system of fibers or channels or a weave or array. Fibers may be provided as a dense woven or knitted mat, or be present as a lofty non-woven mat.

The present disclosure provides an energy circulation system in which there is no external mechanical element or special forms to provide, for example, mixing of reactants, pumping of liquid, controlling fluid flow (e.g., valves). The circulation system with chemicals in a matrix subject to damage energy includes, in situ, elements to produce energy flow and fluid flow within the system, without external mechanisms or special elements in form.

The present disclosure also provides an energy circulation system, comprising a modifying agent in a conduit in a matrix. After an impact, the modifying agent flows into voids in the matrix created by the impact in less than 2 second. In some embodiments, the modifying agent has filled the damages areas within one minute. In some embodiments, all flow has ceased within about one minute.

In some embodiments, the energy circulation system includes metals or other inclusions which can react in the matrix in response to damage energy. Examples of metal inclusions include iron, aluminum and copper, and alloys and combinations of those materials or any other metal or alloy.

The present disclosure, in some embodiments, provides for the use of in situ release fibers designed as energy pumps in the self-repair systems. These fibers functioning as pumps can be impendence, osmotic, magnetic or elastomeric, or pressure release pumping. The modifying agent is released from the conduits in response to a stimulus for self-repair which is transmitted through these conduit release fiber/tube pumps.

The disclosure also provides for the production of energy within the self-repair due to movement of a fluid inside the conduits, such as magnetic tube system. Inclusions of magnetic spheres move and create motion, which then increase the fluid motion and provide increased circulation throughout the system. Magnetism and motion can yield electricity. Magnetic spheres can be half positive and half negative for better mixing.

The disclosure also provides for the absorption of radar energy by the system, such as with glass spheres coated with ferrite all in a liquid. The ferrites absorb radar wave energy, which is expelled as heat energy. The ferrites can also move in the liquid to find the optimum angle of the radar incoming waves.

Also within this disclosure are various special applications such as for sensing of damage and repair, repair of cryogenic tanks exposure to low temperatures, articles which generate their own heat as computers and tires, and space applications in which low gravity and vacuums may affect and allow use of different chemical release systems.

Also within this disclosure is aerodynamic motion control, by the flow of modifying agent within the conduits The conduits, e.g., a weave or array, contain liquid modifying agent which can flow with the motion to create aerodynamic changes which can act to control the shape or angel of the overall structure such as an airplane.

Also within this disclosure is a chemical adhesive for self repair of cementitious articles. This chemical adhesive, as a modifying agent, reacts with an alkaline cementitous matrix when included in a self-repairing system. In some embodiments, the cementitious matrix includes one or all of cement, calcium carbonate, silicates, water, sand and aggregates.

Also within this disclosure is a chemical adhesive for self repair of cementitious articles which can resist or survive high temperatures of cement hydration ad later in-field temperatures.

These and other embodiments and aspects are within the scope of this disclosure.

BRIEF DESCRIPTION OF THE DRAWINGS

FIG. 9 is a schematic illustration of a repair conduit of a self-repairing system producing an electric field, which causes fluid to pump;

FIGS. 10A and 10B are schematic renditions of a repair conduit with the conduit having one part of a reagent inside and a second part of a reagent outside of the conduit as a coating, upon breakage of the conduit the two chemical react forming a chemical matrix.

DETAILED DESCRIPTION

The present disclosure provides various solutions and elements to solve problems associated with the prior art. The repair system of this disclosure provides in situ energy management within the shaped composite, regulating dynamic fluid flow, energy flow and chemical reactions within the composite over time. The present disclosure provides various elements, such as processing of the products under heat, development of adequate repair chemicals in terms of heat resistance, speed of repair, and simple in-situ systems which use the energy and chemical flow in a circulation system to repair well, systems to repair medium to high impact damage, fatigue damage, as well as self forming/self repairing composites as well as other multiple function applications. This disclosure provides, for example, the use of smaller repair conduits, the use of integral channels as well as separate repair fibers, and the conduits could be woven, interwoven or nested with other repair fibers or with reinforcing fibers. This disclosure also provides improved modifying agents, one-part and two-part, improved uses, and improved methods of incorporation into the matrix. The modifying agents can include additives for heat stability, shelf file, water resistance, etc.

In the simplest form, in order to be self-repairing, a special modifying agent is stored in a conduit embedded in a matrix. When the resulting composite is damaged, the damage progresses through the composite matrix, breaking the conduit and releasing the modifying agent. The modifying agent flows into the crack and re-bonds the cracked or delaminated faces.

Figure 1A:
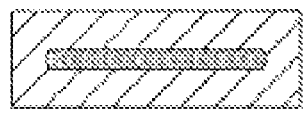
FIGS. 1A-1D are schematic views of a self-repairing matrix composite material, illustrating various stages of matrix repair sequence of load-induced cracking, modifying chemical release and subsequent repair of the matrix and rebonding of the fiber.
Figure 1B:
Figure 1C:
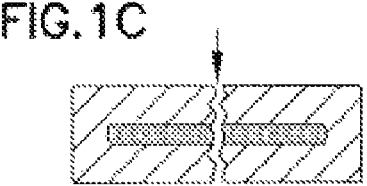
Figure 1D:
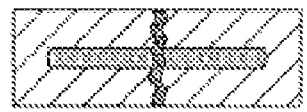

Referring to the figures, and particularly to FIGS. 1A-1D, a self-repairing matrix composite and its operation in the field is schematically illustrated. As depicted in FIG. 1A, a shaped article is formed having a hollow repair conduit, such as a fiber, containing a modifying agent therein and optionally coated with a thin coating material. The repair conduit is dispersed within a settable or curable matrix material, which may be either a polymer or cementitious material. In FIG. 1B, a load applied to the shaped article causes strains within the matrix, which in turn cause the repair conduit to break (FIG. 1C) and the matrix to crack. This causes the modifying chemical agent within the hollow repair conduit to be released into the vicinity of the crack in the matrix as shown in FIG. 1B. The modifying agent flows and fills the void as shown in FIG. 1D and cures to rebond the fiber to the matrix and to repair the fiber to itself. This schematically illustrates the modified fiber concept of the present invention.

The self-repair system is improved over previous systems in that one or more of the following traits are seen in composites, including laminates, incorporating the self-repair system of this disclosure:

(1) the repair system can withstand processing temperatures in a range from no heat (e.g., ambient conditions) to 250° F., 300° F., or 350° F. for several hours, and the resulting composite can withstand high temperatures without damage to the repair system;

(2) the repair system can repair the large scale damage generally experienced with laminates such delaminations as may occur in strong graphite laminates, as well as smaller size damage as in fiberglass laminates;

(3) the repair system can repair impact damage caused by fast and large impacts or forces, as well as slower and lower forces such as fatigue damage, structural cycling, thermal cycling, movement cycling, and creep damage;

(4) the repair system can repair damage in a controlled manner, within less than one minute or up to several days, as desired; and (5) the repair system provides in situ energy management, regulating dynamic fluid flow, energy flow and chemical reactions over time.

The following descriptions of the various components of the self-repair systems of this disclosure provide a background for the later, detailed discussions. It should be understood that the following paragraphs do not limit the later discussions nor are the later discussions limited to the materials provided here. It should also be understood that although specifics or elements have been provided in respect to one of the embodiments or methods, that all the specifics and elements can be used interchangeably throughout the teachings of this disclosure, as appropriate.

Uses for Technology

The shaped articles or composites disclosed herein or made by the methods disclosed herein can be used in any number of goods. Examples of uses for the composites include in materials such as those used in construction, building, roofing, roadway, industrial, aircraft, automotive, marine, appliances, recreational, electronic goods, transportation and/or biomedical fields.

Examples of construction, building, roofing or roadway uses include cement, concrete, phosphate cements, roads, infrastructure, earthquake-resistant buildings and other structures, bridges, tunnels, and pothole repair.

Examples of industrial applications include filament wound cryogenic tanks, cryotanks to resist hydrogen, oxygen, nitrogen, other gases, at various temps, cryotanks for laser systems, thermally cycled bonds, adhesively bonded joints, nuclear power plant towers, oil rigs and pipelines, power grids, gas pipes, concrete girders, reinforcing tendons, structural composites, windows, and containment structures for radioactive or chemical wastes.

Examples of aircraft, automotive, marine and other transportation applications include tires and tire parts, boat and submarine hulls, airplane hulls and wings and other structures, helicopter structures including rotor blades, space vehicles and satellites, automotive body and frame parts, truck trailers and tanks, and engine pistons.

Examples of recreational applications include golf balls and clubs, bicycles, hockey and lacrosse sticks, tennis rackets, bats, helmets, armor, padding and other safety equipment, goalposts and net supports, pleasure craft, and floatation devices.

Examples of electronic goods include electronic packages, printed circuit boards (PCBs) and PCB laminates, electronic encapsulants, electronic die attach, and housings for computers, computing devices and other electronic goods.

Examples of biomedical applications include bone grafts and natural bone growth, implants, prostheses, smart-release bandages, artificial skin materials, poultices and the like which include additives which release healing chemicals or healing promoting chemicals by upon movement of the patient or by application of another stimulus, such as for example, a heating pad, or the like. The composites used in these bandage applications might include such release chemicals as oxygen releasing chemicals, moisturizers, aloe vera, antibiotics, anti-inflammatants, analgesics, non-stick agents or the like.

The self-repairing composites could also be used for other miscellaneous applications such as pipe repair, rubber matrices, plastic packaging, adhesives, impregnating resins, and paints, finishes, sealants and coatings, which could be scratch resistant.

In some embodiments, the self-healing composites, when polymeric based, have a flexural modulus of from about 2,000 to about 200,000 psi.

Matrix

As provided above, the basis for the composite materials is a matrix material, which can include any curable, settable material. Typically, these materials are moldable or castable to form shaped objects or may be laminated or may be laminated or assembled into finished products, such as those listed above.

The matrix can be organic or organic based. Examples of matrix materials include polymeric materials, cementitious materials, and polymeric ceramic matrix. In some embodiments, the matrix may be self-forming, from materials present within conduits, as is described below.

A polymeric matrix can include thermosetting resins, thermoplastics, and elastomers. Thermosetting resins include temperature-activated systems, polymerization agent-activated system, and mixing-activated systems. The thermoplastics can be noncrystallizing thermoplastics or crystallizing thermoplastics. Examples of thermoplastics that can incorporate the self-healing system include olefinics, vinylics, styrenics, acrylonitrilics, acrylics, polyacrylates, polycarbonates, polyalloys, cellulosics, polyamides, polyaramids, thermoplastic polyesters and copolyesters, polyethers, phenol-formaldehyde resins, amine-formaldehyde resins, poly (acrylonitrile-butadiene-styrene), polyurethanes including foaming polyurethanes, polyolefins, polysilanes, sulfones and polysulfones, polyimides and imide polymers, ether-oxide polymers, ketone polymers, fluoropolymers, and heterochain polymers, and the like. Additional examples of thermosetting resins include, for example, epoxy systems (both one-part and two-part systems), formaldehyde systems, urethane/urea systems, formaldehyde systems, furan systems, allyl systems, alkyd systems, unsaturated polyester systems, vinyl ester systems, and the like. Epoxy systems include cycloaliphatic epoxies, diglycidyl ether of bisphenol-A or its brominated versions, tetraglycidyl methylene dianiline, polynuclear phenol epoxy, epoxy phenol novolac, epoxy cresol novolac, hydantoin epoxies, and so forth. Epoxy resin systems can be processed in a variety of manners and can be cured at low or elevated temperatures. Formaldehyde systems include urea-formaldehydes, phenol formaldehydes, and melamine formaldehydes.

Elastomers that can be enhanced by this invention include vulcanizable elastomers, reactive system elastomers and thermoplastic elastomers. Examples of such elastomers include diene and related polymers, elastomeric copolymers, ethylene-related elastomers, fluoroelastomers, silicone polymers, and thermoplastic elastomers. Thermoplastic elastomers can include rubbery polymers and copolymers including, for example without limitation, styrenebutadiene rubber (SBR), neoprene, EPDM and silicone rubbers and the like.

Examples of thermosetting materials that can be used as a matrix with the self-repair system include acrylates, methacrylates, cyanoacrylate resins, epoxy resins, phenoplasts such as phenolic resins, aminoplasts such as melamine-formaldehydes, unsaturated polyester resins, vinyl ester resins, polyurethanes, and so forth.

Low viscosity resins can be cast. Molding compounds can be injection molded, compression molded, or transfer molded.

Concrete, cement, phosphate cements, sintered fly ash or bottom ash/phosphoric acid mixtures, and asphalt are also common matrices for the self-repair system. The system is particularly suited to withstand survive field mixing, placement of the repair conduits in or under the top of such articles so that future impact, shear cracking, fatigue, creep and drying shrinkage damage can be repaired.

The matrix materials may be cured by means of catalysts, crosslinkers, radiation, heat, laser beam or by any means used with monomers reacting with resins or polymers in the art for setting up, hardening, rigidifying, curing or setting these matrix materials to form shaped articles or objects. The matrix compound should be formulated to minimize any potential inhibiting activity by it relative to the modifying agent.

Repair Conduits

Throughout the matrix are distributed the repair conduits. The repair conduits can be any suitable structure that provides a vessel for receiving and retaining modifying agent until ruptured and released. In most embodiments, the repair conduit has an internal volume for receiving and retaining the modifying agent. The structure of the repair conduit should be such to adequately rupture or break to release the modifying agent.

Examples of fibers that can be used as repair conduits include hollow optical fibers, glass tubes, glass pipettes, carbon fibers, straws, and the like. Fibers have an internal volume that can be defined by a surrounding wall. The fiber can be filled with modifying agent prior to or subsequent to incorporation into the composite. Some typical materials for fibers include glass, polymeric or plastic, fiberglass, quartz, carbon and metal. Other typical materials for fibers include hydrous metal oxide, silica, silicates including borosilicates, silicon, and silicate type sol-gel precursors. Examples of typical organic fibers include polyolefin fibers, polypropylene fibers, polyester fibers, polyamide fibers, polyaramid fibers, urea-formaldehyde fibers, phenolic fibers, cellulose fibers, nitrocellulose fibers, GORTEX fibers, and KEVLAR fibers. Glass fibers and similar are preferred because of the ease of melting, bending, and forming; for example, the ends can be melted to be sealed.

Fibers may be rigid or may be flexible and/or bendable. For example, the fibers may be sufficiently flexible insert into pre-pregs, tows or weaves and yet be breakable. Multiple fibers could be woven to provide a mat of repair conduits.

In some embodiments, the fibers may have a coating or other surface treatment to modifying the fiber properties. For example, a coating or other surface treatment may be present to inhibit compromise of the modifying agent, such as by the fiber material. The fiber interior or exterior could be coating with, for example, metal or carbonyl iron ferrite. Radar waves induce alternating magnetic fields in carbonyl iron ferrite which causes conversion of their energy into heat. As another example, the interior surface of a fiber may have a coating to reduce surface tension, thus increasing capillary flow along the surface. As another example the interior or exterior coating may be metal to allow an electrical current to flow along the fiber.

Volumes void of matrix, e.g., channels, can be formed (e.g., integrally) in the matrix and used as repair conduits for retaining and releasing modifying agent. Such channels have an internal volume defined by the matrix itself. The channels are generally filled with modifying agent after incorporation into the composite. In some embodiments, a sacrificial fiber or tube may be used to form the channel. Upon a condition, for example heating, the sacrificial tube or fiber may melt or otherwise disintegrate, leaving an empty channel.

The sidewalls of the conduits are typically rupturable or porous to permit the discharge or exiting of the modifying agent into the surrounding matrix material upon the appropriate stimulus.

The repair conduits may be bundled, woven or loose. They may be held or engaged together with flexible web materials. They may comprise twisted pairs (as in FIGS. 4A and 4B) and additionally may include concentric structures of one or more fibers. It is not necessary that the repair conduits have a single, elongate volume, as do the fibers and channels described above. Multiple fibers or channels could be interwoven and connected to form an interconnected grid or matrix of conduits that has one large volume. The pattern could be, for example, a honeycomb pattern or a checkerboard pattern, having conduits positioned orthogonal to each other. Such interconnected fiber structures have capillary channels therein to allow the modifying agent to flow through the structure. In some embodiments, the interconnected fiber structure is 3-D, with X-, Y-, and Z-direction fiber systems, thereby providing a system for distributing the modifying agent uniformly through the matrix.

In addition, a plurality of hollow beads could be used as repair conduits.

The repair conduits, whether fibers, channels, beads or other structures, can be any desired size, length, have any wall thickness or cross-sectional configuration. In most embodiments, the repair conduits have a diameter of 100-1200 micrometers. The conduits may be relatively small, chopped or comminuted fibers having lengths of less than about one inch and diameters of less than about 100 microns. The small size of the conduits is preferred so that they do not interfere with the action of the composites, e.g., laminated composites, no matter where they are reinserted yet they should have sufficient volume to carry of modifying agent to fill and repair cracks. Examples of suitable sizes of outside diameter/inside diameter of fibers include 250/700, 500/850, 1000/1300, 1000/1600 micrometers. In some embodiments, such as when two different modifying agents are used, or when the modifying agent is a two-component system, two different sizes of conduits may be used.

Modifying Agent

Retained within the repair conduit is at least one modifying agent. In some embodiments, the repair conduit is made from the modifying agent; i.e., the modifying agent forms its own shell, which acts as the repair conduit.

Figure 4A:
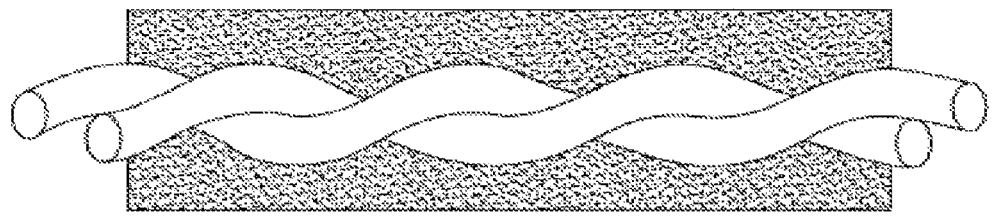
FIGS. 4A and 4B are schematic views of a self-repairing matrix composite material, illustrating release and repair from twisted fiber bundles, whereby compressive loading causes unlocking of the twisted fiber bundles to release modifying agent into the adjacent matrix.

Typically the modifying agent is liquid, so that it readily flows out from the conduit. The modifying agent may be a one-part material that self-reacts or two-part (or more) material. Generally for two-part materials, one part is present in the repair conduit and the second part is present in either the matrix or other repair conduits. FIG. 4A illustrates two repair conduits in close proximity to each other; in this embodiment, one conduit can include the first part of a two-part modifying agent and the second conduit can include the second part.

Figure 4B:
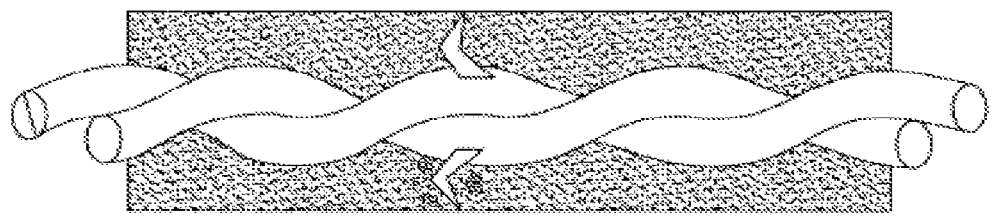

Upon damage of the composite, the modifying agent is released from the repair conduit, moved around in the circulation system of the self-repair system, and chemically and/or energetically altered. In FIG. 4B, the conduits are ruptured, so that the two modifying agents flow into the damaged area, react together, and repair the area.

The modifying agent, present within the repair conduit, is selected from materials capable of beneficially modifying the matrix composite after curing. The modifying agents are selectively activated or released in or into the surrounding matrix in use in response to a predetermined stimulus be it internal or externally applied. In some embodiments, additional chemicals or secondary modifying agents are present in the matrix which can be pulled along and self polymerized or yield a continual reaction.

The modifying agent may be a commonly available or simple chemical or may be an 'exotic' chemical. Exotic chemical have reactions such as reactions involving condensation reaction polymers, ROMP (ring-opening metathesis polymerization) reaction, Bergman cyclization or Diehls Adler reactions. Some of these reactions are intended to not require mixing but are fully consumed by the chemical reaction itself without outside heat or mixing, they are autonomous.

The modifying agent is a polymerizable compound and can be a monomer, oligomer or combination thereof. Examples of polymerizable compounds include acrylates including cyanoacrylates, olefins, lactones, lactams, acrylic acids, alkyl acrylates, alkyl acrylic acids, styrenes, isoprene and butadiene. The modifying agent can be an expoxide material, either one-part or two-part.

Suitable cyanoacrylates include ethyl cyanoacrylate, methyl cyanoacrylate, bis 2 cyanoacrylate, cyanoacrylates with silicon, fluoroalkyl 2 cyanoacrylate, aryloxy ethyl 2 cyanoarylate, cyanoacrylates with unsaturated groups, trimethylsilyl alkyl 2 cyanoacrylate, and stabilized cyanoacrylate adhesives, such as taught in U.S. Pat. No. 6,642,337 and U.S. Pat. No. 5,530,037.

Olefins include cyclic olefins, e.g., containing 4-50 carbon atoms and optionally containing heteroatoms, such as DCPD (dicyclopentadiene), substituted DCPDs, DCPD oligomers, DCPD copolymers, norbornene, substituted norbornene, cyclooctadiene, and substituted cyclooctadiene. Specific examples include, but are not limited to norbornene (such as triethoxysilylnorbornene, norbornene, ethyl norbornene, propylnorbornene, butylnorbornene, hexylnorbornene), alkyl-substituted norbornene derivatives, and alkoxysilynorbornenes. Corresponding catalysts for these are ring opening metathesis polymerization (ROMP) catalysts such as Schrock catalysts.

Lactones, such as caprolactone and lactams, when polymerized will form polyesters and nylons, respectively. Corresponding catalysts for these are cyclic ester polymerization catalysts and cyclic amide polymerization catalysts, such as scandium triflate.

Still another class of modifying agents particularly useful in polymer matrices are solvents which permits solvent action to actually repair microcracking damage locally at a cracking site or possibly to dissolve the matrix or fibers or both to permit them to re-form at a later time.

In addition to solvents, other curable monomers and co-monomers may also serve this repair function. pH modification agents may also be used as the modifying agents, either alkali or acidic agents, which may be placed in the interior of the fibers only to be released by an appropriate pH changes in the matrix. Other additives may include flame retardant agents. Visco-elastic polymers may also be used as modifiers.

The modifying agent may be a catalyst, which is a compound or moiety that will cause a polymerizable composition to polymerize, and is not always consumed each time it causes polymerization. Examples of catalysts include ring opening polymerization (ROMP) catalysts such as Grubbs catalyst, and also other ruthenium, iron, osmium, rhodium, iridium, palladium and platinum. The modifying agent may alternately be an initiator, which is a compound that will cause a polymerizable composition to polymerize, and is always consumed at the time it causes polymerization. Examples of initiators are peroxides (which will form a radical to cause polymerization of an unsaturated monomer); a monomer of a multi-monomer polymer system such as diols, diamines, and epoxide; and amines (which will form a polymer with an epoxide). In other embodiments, the modifying agent may be a native activating moiety, which is a moiety of a polymer that when mixed or contacted with a polymerizer will form a polymer, and is always consumed at the time it causes polymerization. Examples of a native activating moiety include an amine moiety (which will form a polymer with an epoxide).

Certain water barriers are particularly useful modifying agents for cementitious matrices. These may include special ZYPEX brand sodium silicate additives, as well as siloxane and silica additives known as SALT GUARD and the like.

No matter what the modifying agent used for the repair, one or more modifying agents can be present in and/or on the repair conduit.

The modifying agent, in some embodiments, can resist high temperatures of processing (e.g., 250° F., or 300-350° F.), boiling, have a long shelf life, and react fast (e.g., in less than one minute, and in some embodiments, less than 30 seconds). Additional details regarding high temperature resistant modifying agents are provided below. One modifying agent that is suited for high temperature processing is epoxy. A specific epoxy class that has been found to be particularly suited for moderate temperature processing is epoxy vinyl esters; such as those commercially available under the trade designation DERAKANE.

Means are provided for maintaining the modifying agent within the hollow fibers. The modifying agents may be physically trapped by, for example, drawing liquid additives into the interior of the fibers and retaining them therein by capillary action or by closing off the ends of the fibers.

Structural Reinforcing Materials

The matrix typically includes, as needed or desired, dispersed therein structural reinforcing materials such as reinforcing fibers or fillers. These reinforcing materials generally increase any or all of tensile strength of the composite, compressibility, toughness, ductility, and the like.

Examples of commonly used fiber reinforcements include silica fibers, glass fibers, polymeric fibers (including nylon, aramid, polyolefin, polyethylene and polypropylene), carbon fibers, ceramic fibers, and metal fibers. Fiber reinforcements may be present as individual fibers, as yarns or threads, or as mats of multiple fibers.

Rebar is a common large-scale reinforcement for concrete matrices.

Examples of suitable reinforcing fillers include: metal carbonates (such as calcium carbonate (chalk, calcite, marl, travertine, marble and limestone)), calcium magnesium carbonate, sodium carbonate, magnesium carbonate), silica (such as quartz, glass beads, glass bubbles and glass fibers), silicates (such as talc, feldspar, mica, calcium silicate, calcium metasilicate, sodium aluminosilicate, sodium silicate), metal sulfates (such as calcium sulfate, barium sulfate, sodium sulfate, aluminum sodium sulfate, aluminum sulfate), gypsum, vermiculite, wood flour, aluminum trihydrate, carbon black, certain metal oxides (such as calcium oxide (lime)), alumina, tin oxide (e.g. stannic oxide), titanium dioxide, metal sulfites (such as calcium sulfite), thermoplastic particles (e.g., polycarbonate, polyetherimide, polyester, polyethylene, polysulfone, polystyrene, acrylonitrile-butadiene-styrene block copolymer, polypropylene, acetal polymers, polyurethanes, nylon particles) and thermosetting particles (such as phenolic bubbles, phenolic beads, polyurethane foam particles). Other miscellaneous fillers include sulfur, organic sulfur compounds, graphite, boron nitride, and metallic sulfides. The above mentioned examples of fillers are meant to be a representative showing of some useful fillers, and are not meant to encompass all useful fillers.

Of course many of the filler materials named above may also be used as a repair chemical encapsulants for example a hollow rebar in concrete could contain a repair adhesive, as can porous aggregates. That is, they may act as functional additives. Other inclusions may have a significant role in self repair such as metal particles which could heat the matrix and cause self repairing chemicals to chemically react Functional Additives The matrix may include, as desired, any number of optional additives that modify or affect the properties of any one or more of the repair conduit, the modifying agent, the matrix, and their interactions with each other. A mere sampling of suitable functional additives is provided below.

Examples of clays include silica clay, green clay, kaolinite, bentonite, montmorillite, and nanoclays.

Examples of commonly used inclusions include metal powders, glass flakes, mica, aluminum flakes, alumina trihydrate, calcium carbonate, carbon black, solid microspheres and hollow microspheres.

Examples of conductive or semi-conductive particles include carbon; carbon black; graphite; silicon; silicon carbide; III-V semi-conducting materials including gallium arsenide, gallium nitride, gallium phosphide, gallium antimide, aluminum antimide, indium arsenide, indium phosphide, and indium antimide; II-VI semi-conducting materials including zinc oxide, cadmium sulfide, cadmium telluride, zinc sulfide, cadmium selenide, zinc selenide; and IV-VI semi-conducting materials including lead sulfide and lead telluride.

Metal particles include iron, tin, zinc, aluminum, beryllium, niobium, copper, tungsten, silver, gold, molybdenum, platinum, cobalt, nickel, manganese, cerium, silicon, titanium, tantalum, and magnesium mixtures and alloys thereof; metal alloys such as steels and tool steels, stainless steels, plain carbon steels, low carbon steels, aluminum-nickel, brass, bronze; and alloys used for biomedical applications such as cobalt-chromium, cobalt-chromium-molybdenum, cobalt-chromium-tungsten-nickel, cobalt-nickel-chromium-molybdenum-titanium, and titanium-aluminum-vanadium alloys.

Optional Additives

The matrix or resulting composite can include optional additives such as, for example, UV stabilizers, heat stabilizers, antioxidants, colorants, flame retardants, anti-corrosion chemicals, anti-freeze materials, antimicrobials, odorants, surface-modifying additives, processing aids, coupling agents, viscosity modifiers, pH modifiers, plasticizers, and/or bulk modifiers.

In addition these additives could be released also as a chemical to beneficially enhance the matrix.

Of course, other additives could be added to the composite, for any reason. It is understood that although examples of specific materials are provided in various classes, that these materials may provide additional advantages to the matrix and/or composite.

Providing the Article

The composites having the self-repair system can be shaped into desired shapes by any convenient technology, including, for example, lamination (such as form making fiber-reinforced plastics and structural composites using fiber preforms or fiber pre-pregs, and so forth), injection molding (such as for making microelectronic parts, watch components, locating pins, bushings, ribs, flanges, dashboards, outdoor furniture, and so forth), extrusion (such as for making sheets, pipes, fibers, pellets, and so forth), extrusion covering (such as for making sheathing for wires and cables), film blowing (such as for making single or multi-layer covers, and packaging applications such as wrap, can lining, bags, and so forth), calendering (such as for making flat films or sheets), sheet thermoforming (such as for making blister packs, individual containers, structural panels and liners, windows, skylights, and so forth), blow molding (such as for making packaging and storage containers), coating on a substrate (such as for films, tapes, structural skins, flooring, wall coverings, and so forth), rotational molding (such as for making open containers, seamless flotation devices, toys, structural components), casting (such as for making encapsulated, embedded or potted electronic parts), compression molding (such as for making electrical and electronic goods, knobs, buttons, closures, eating utensils, tire parts, and so forth), transfer molding (such as for making complex or fragile polymeric products), and sintering and machining.

The basic elements and ingredients provided above can be assembled to provide composite materials with desirable properties. The preferred processing methods, additional matrices, modifying agents, conduits, and uses for the composites are described in U.S. Pat. No. 6,261,360, U.S. Pat. No. 5,989,334, U.S. Pat. No. 5,803,963, U.S. Pat. No. 5,660,624, U.S. Pat. No. 5,575,841, and U.S. Pat. No. 5,561,173, the entire disclosures of which are incorporated herein by reference.

1. Self-Repair of Impact Damage in Composites, in General

An opportunistic dynamic notion of materials is included in this approach of self-repairing materials. As such, it can go beyond self-repair and solve problems with new totally dynamic structures in terms of their energy, design for material flow and chemical change of the materials, all over the time of the composite (e.g., creation to final destruction). Improved over prior self-repair systems and materials, the present invention provides new and improved structural composite materials, including composite laminates, having a self-healing or self-repairing capability whenever and wherever cracks, delamination or other damages are generated. This new understanding of the dynamic aspect and potentialities of materials, e.g., the energy, flow of fluids and chemical reactions over time, provides improved systems.

In some embodiments, the energy of an impact is transformed and is equal to the energy to form the delaminations and fiber breakage and matrix cracking. In self repairing systems the energy of impact is transformed and is equal to the energy to form the delaminations and fiber breakage and matrix cracking as well as the energy of repair tube rupture and force on the chemical pushing it out. This energy sum is matched in some proportion, preferably at 70-100%, by the energy of adhesive repair to re-attach the laminate layers, re-attach the broken fibers and the broken repair tube. This can be measured by strength restoration as fracture toughness which measures the energy required to pull laminates apart, of compression of flexure. For example, about 5-50 joules are needed to delaminate a 16-32 ply carbon composite laminate having graphite composite material and the repair with different repair chemicals can be 70-94%

These systems for self-repair of impact damage in composites and composite laminates (e.g., graphite and fiberglass laminates) includes chemicals that are able to withstand the heat of processing, e.g., at least 250° F. and at least 350° F. Additionally, the systems are able to repair quickly (e.g., in less than one minute). The repair system may be a one-part or two-part system designed to withstand levels of impact appropriate for the application (e.g., high strength graphite).

The present disclosure is to composite matrix, including laminates, having a plurality of hollow repair conduits dispersed therein, a modifying agent present, at least, within the repair conduits and/or thereon. Two examples of repair conduits are hollow repair fibers and channels. Upon a predetermined stimulus, the modifying agent is released from the repair conduits into the matrix material. The matrix and the repair conduits together form an in situ fluidic system that transports the modifying agent(s) throughout the matrix.

In many embodiments, the matrix, including the modifying agent and repair conduit, is particularly suited for use in or processing under high temperature applications, e.g., at least 250° F., often 250-350° F., for extended periods of time, such as 1-2 hours. In some of these embodiments, the modifying agent is sufficiently heat stable to withstand the high temperatures. In embodiments where the stability of the modifying agent under high temperatures is questionable, the modifying agent can be applied to the fiber after the high temperature processing. In most embodiments, the resulting article can withstand heat of use of the article and can also withstand any heat generated by energy production in or by the article during use.

Means are provided for maintaining the modifying agent within the hollow conduits. The modifying agents may be physically trapped by, for example, drawing liquid additives into the interior of the conduits and retaining them therein by capillary action or by closing off the ends of the conduits. As described later below, pump(s) conduits may be used to pull or push the modifying agent out of the conduit.

Means are also provided for permitting selective release of the modifying agent in response to the external stimulus. Illustrative examples include cracking, breaking, bending or otherwise breaching the wall of the conduit, for example, by selectively removable or dissolvable coatings which give way to permit leakage of the modifying agent in response to, for example, stimuli such as very high heating, cooling, loading, impacting, cracking, water infusion, chloride infusion, alkalinity changes, acidity changes, acoustic excitation, low frequency wave excitations, hydrostatic pressure, rolling pressure, light sensitivity or laser excitation, thermal, load cycling or the like. Electrical currents, voltages, electrorheological excitation, radiation, or other energetic stimuli may also be employed or effective to permit or cause selective release of the modifying agent or agents from the fibers.

The selective release of the modifier occurs in the matrix when and where it is required and may lead to improved toughness, strength, ductility, brittleness, permeability, fire retardancy, stiffness, dimensional stability, modulus of elasticity, fatigue, impact resistance, and other improved properties of the matrix composite. The selective release of the modifying agent may be chosen to be effective to rebond the conduits to the matrix, to repair the conduits themselves, to improve or restore the matrix to conduit interface, to repair delaminations, and to repair microcracks in the matrix itself which may repair or overcome cracking or corrosion induced dimensional weaknesses and ultimately reduced durability for the shaped articles.

It is known that alkali reactions are sometimes caused within cementitious matrix materials when aggregate reacts with matrix and causes an expansion of the aggregate against the matrix. This causes internal stresses to develop within the matrix composite or shaped article, which usually appears as cracks within the matrix. The use of the self-repair system with modifying agent in conduits will repair some of these cracks. In addition, instead of adhesives, the conduits may be filled with pH modification agents such as acidic agents to neutralize the alkali reaction. In addition, conduits filled with the alkali reaction inhibiting acidic modifying agent may be used in combination with the matrix repair adhesive filled conduits.

Self-healing may be accomplished by leaving some of the original conduits void or by adding additional conduits designed with specialty repair agents for repairing the system. Hollow porous conduits may be used to deliver repair agents at a later time if damage such as cracking occurs. Repair modifying agents, either present as an adjuvant conduit additive or added to conduits from the outside, may be used to improve the visco-elasticity of the entire component as desired.

2. Self-Repair of Impact Damage in Laminates

The present disclosure provides self-repair of impact damage in composite laminates, for example, graphite and fiberglass laminates formed from pre-impregnated layers (i.e., pre-pregs). In most cases, this damage is in the range of 5 to 50 Joules, but could be higher or lower. It is believed that the maximum load or peak contact force, energy-to-maximum load, total energy, and deflection-at-maximum load increases parabolically with an increase in impact energy level, whereas time-to-maximum load or impact duration at the peak load decreases linearly.

In many embodiments, to obtain self-repair system that meet the desired criteria, this includes using developed chemicals that can withstand the heat of processing for laminates, e.g. at least about 250° F., and often 350° F. The self-repair system is designed to withstand the levels of impact appropriate for high strength laminates, such as graphite laminates, and repair quickly after damage has occurred.

Figure 2A:
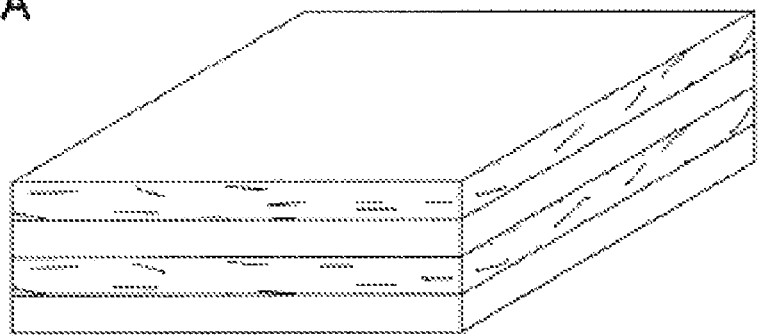
FIGS. 2A and 2B are schematic views of a composite material including a matrix with randomly dispersed repair fibers.
Figure 2B:
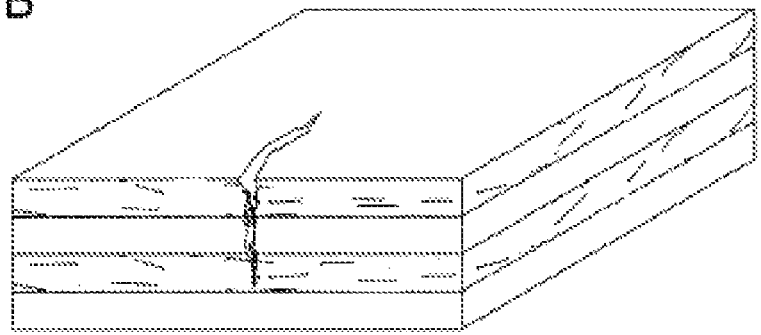

Referring to FIGS. 2A and 2B, a layered laminate is illustrated. In these figures, one layer including individual repair conduits therein. The other two layers would typically include reinforcement materials, such as reinforcing fibers. FIG. 2A shows the laminate intact, prior to any damage.

A laminate composite article includes at least two layers or plies of material, usually at least four layers. Up to 100 layers, or more, can be used in laminates. For some applications, laminates having 24-32 layers are preferred. Typically, the strength, toughness and rigidity of the laminate increase as the number of layers increases, however, so does the weight of the laminate.

For impact damage self-repair of laminates, the forces caused by the impact break the repair conduits and force the modifying agent into the damaged site within less than a second. No pump or other mechanism is needed to move the modifying agent, as simple pressure differences between the repair conduit interior and the void in the laminate caused by the impact forces the modifying agent to the damaged site. No mechanical valves are needed, as the modifying agent fills the voids and then stops flowing out of the conduits when the pressure differential has lessened.

When a one-part modifying agent is used, no mixing required. The modifying agent readily reacts with the laminate layers (e.g., the pre-preg). For a laminate (i.e., a multi-layer structure), only one layer needs to include the repair conduits, as the modifying agent readily flows along the layer interfaces, including up against gravity, when an impact occurs. Additionally, the voids and broken reinforcing fibers themselves provide conduits for flow to damaged areas. FIG. 2B illustrates a damaged laminated with modifying agent flowing to fill the damaged area.

Figure 5:
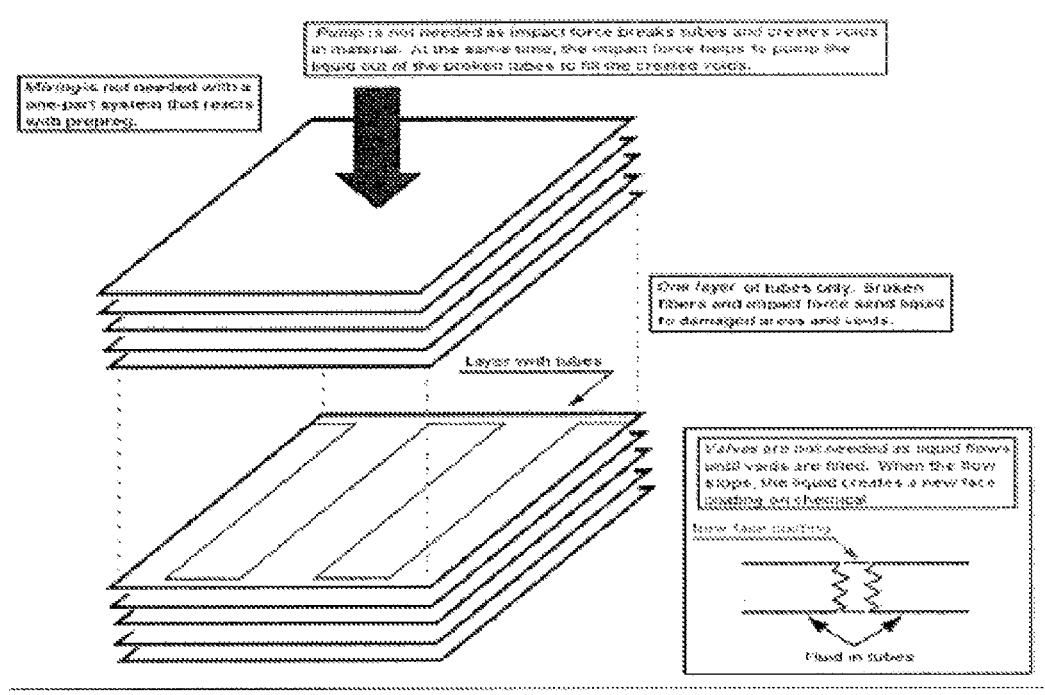
FIG. 5 is a schematic rendition of an embodiment of a self-repairing dynamic system.

FIG. 5 illustrates an alternate embodiment with one layer of repair conduits in a laminate. In this self-repair system, (1) pumping occurs by impact force affecting the repair conduit, a basic impedance pump requiring no mechanical parts, (2) there is a one part modifying agent which requires no mixing, (3) only one layer of repair conduits is used because the repair conduits break and allow the modifying agent to rush into damaged areas, and (4) valves are not needed to push or halt the flow of modifying agent.

A second active agent, in addition to the modifying agent (s), could be added to the system. This second active agent could be selected to benefit the composite structure at a different time, separate from the destructive impact.

Overall, the whole laminate acts as a circulatory microfluidic device. This is in keeping with the biomimetic principles of keeping the design simple and the source of energy intrinsic.

3. Self-Repair of Fatigue Damage

The present disclosure provides self-repair of non-forceful damage such as fatigue and thermal cracking that might occur over time a material. In such designed composites, integral channels within the matrix are preferred, although fibers would also be suitable.

Embodiments are designed to withstand levels of impact appropriate for the high strength graphite laminates and also for fatigue, thermal cycling and creep, which is a lower level force over longer time. Both laminates and single layer composites undergo fatigue, and the technology described herein can be used for both laminates and single layer composites.

Figure 3A:
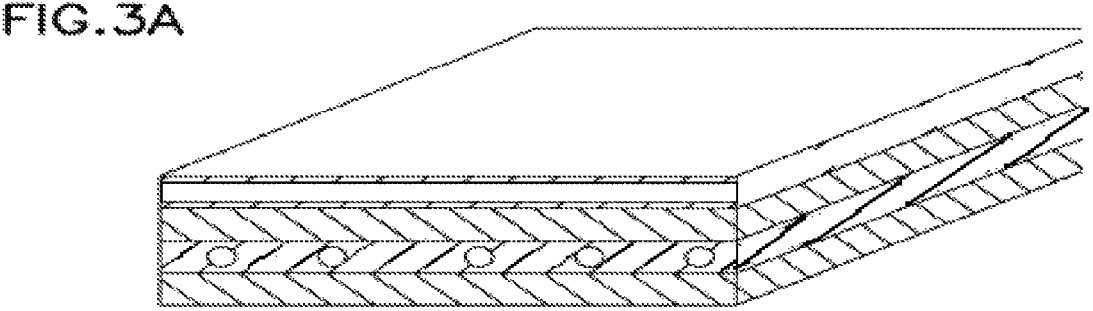
FIGS. 3A and 3B are schematic views of a laminate composite material including a matrix with a layer of oriented repair fibers.
Figure 3B:
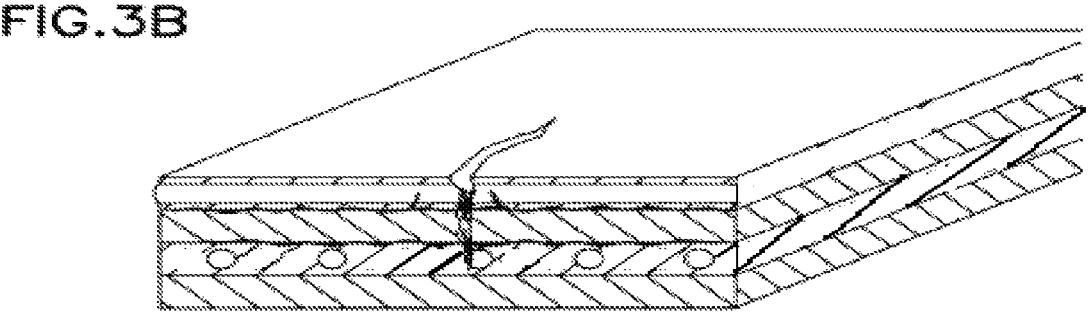

The repair conduits may be present within the composite in a homogenous manner (e.g., randomly distributed) or in a layer. FIGS. 2A and 2B illustrate a matrix having many repair conduits, with the conduits randomly distributed through the layers. This is a matrix such as concrete, or a polymer matrix without a laminate structure FIGS. 3A and 3B, illustrate a laminate having one layer of repair conduits. In alternate embodiments, the repair conduits may be present as a three dimensional (3-D) system of fibers or channels or a weave or array or in layers orthogonal to each other. Fibers may be provided as a dense woven or knitted mat, or be present as a lofty non-woven mat. When pre-preg sheets are used, upon heating the resin from the sheets can readily flow and flow around the repair fibers thus incorporating the system of repair conduits into the laminate without much diminution in structural properties.

Low energy cracking or damage systems include applications such as bonded joints in electronics and cryogenic filament wound tanks. In these applications, the release of self-repair materials is elicited by service loading conditions: thermal cycling in space environments, static creep and mechanical fatigue imposed by joint configurations, and residual stresses due to mismatch of thermal expansion (bonded joints) or fabrication processes (filament wound cylinders). The self-repair system, particularly the modifying agent, must not cure or degrade during thermal cycling over a temperature range that spans from cryogenic temperatures to well above the typical composite cure temperature.

For fatigue environments, e.g., mechanical fatigue, thermal cycling and static creep, all of which can result in cracking that leads to crack propagation, a different set of forces apply, as compared to impact environments. Often, the dynamic system fatigue is caused by less force and repeated over a longer schedule of time. For a single layer composite, the damaging forces would be in a smaller area or volume than in a laminate.

The damage causes a space or void such as a crack to form in the composite. The damage also ruptures the repair conduit, which causes the modifying agent to at least ooze of flow out. As the modifying agent fills the void, it reacts, either by itself or with a second part. Generally, the modifying agent stops flowing when the space is filled or there is no more pressure differential or void creation to push or attract the modifying agent out from the conduit.

Together, a total system is created, the system including the created breaks in the repair conduit, together with the cracks or voids in the matrix, ruptured conduits, and modifying agent migrating out of the conduits into the cracks.

4. Multifunctional Applications with Self-Repair

In some embodiments, it is desired to provide the self-repair systems with additional properties in addition to the self-repairing properties. For example, repair conduits, e.g., hollow glass fibers, can be filled with colored or tinted modifying agent which provides a color change upon reaction, thus providing visual indication when the modifying agent has been activated. In some embodiments, the electronic properties of the materials may be affected by the release of the modifying agent.

Electrically active or magnetic material (e.g., beads or particles, either solid or coated) could be used to create circulation energy, e.g., when retained in a fluid. Ferrite particles or a ferrite coating could be included to absorb radar energy and produce heat.

The ferrites can be positioned at various appropriate angles to the radar angle by the interaction of the charges on the individual magnetic particles. In general, the ferrites are free to move in a more active way in a liquid modifying agent, the heat from the energy conversion can be transported away via the in situ circulation system of the self-repair system, and the overall system can be multifunctional and self-repairing.

5. Self-Formation of Matrix

During a composite's life, the composite it formed over time, it functions over time and deteriorates over time, after which it may be thrown away. The composite may have various functions at the same time. A preferred composite is a multifunctional system in matrices with repairing modifying agent that can withstand the heat of processing and any other heat of uses. It is efficient to envision materials which are planned from formation, repair, function and disposal. This disclosure provides methods of making materials (e.g., matrices) by using conduits to both form the composite material and provide self-repair properties to it.

The preferred embodiment of a self-forming composite includes a total dynamic energetic circulation system that functions as an in situ fluidic system; for a laminate, this in situ fluidic self-forming system is present in at least one layer or area. An impact or fatigue energy or other energies are delivered to the composite or laminate to cause energies which in turn cause energy evolution and also creation of the composite structure. Usually subsequent to the forming of the composite, the energy self-repairs any damage to the composite.

At the same time (in impact or fatigue) or subsequently (in fatigue), failure energies or cracking of the conduit or coating release any remaining modifying agent and the energies act as a impedance pump, pushing out the modifying agent. The void caused by the failure has an attractive force and the modifying agent flows into the void. The energy also either mixes two-part modifying agents, pushes the modifying agent to the matrix walls, or causes the modifying agent to react with the force alone or the force causes the modifying agent to react with particles or causes particles to react.

In an embodiment of the invention, the modifying agent is a curable composition which reacts after release to cure within the matrix composition. The matrix composition includes a co-reactive component which reacts directly with the modifying agent upon release of the modifying agent. Optionally, another co-reactive component can be delivered or provided in the matrix which further reacts with by-products of a cure reaction of the modifying agent, e.g., for subsequent damage repair.

In various embodiments wherein the curable matrix composition has at least one curable monomer, the modifying agent may be a reactive co-monomer, crosslinking agent, hardening agent, crosslinking catalyst, or a mixture of any of these which is capable of affecting the rate or participating in a cure reaction of each curable monomer. In some applications, the modifying agent may be coated on the outside of the fiber.

Repair conduits may be used to influence curing through thermal means. Such a system is particularly suitable for affecting curing of thick material sections more quickly or in any curing matrix formation wherein thermal control is desired, such as to prevent cracking from thermal stress due to nonuniform or excessively fast curing. Other composition reactive agents can be actuated by heat. To this end, a method for making an article includes providing a plurality of hollow conduits surrounded with a shapeable curable matrix composition. A temperature-enhancing fluid, such as a coolant, steam or other heating fluid, is introduced or flowed into the interior portion of at least one of the hollow conduits. Heat is thereby transmitted or absorbed from the intermediate portion of the hollow conduit into the curable matrix composition to either initiate or influence time of curing of the matrix composition and the modifying agent into a shaped matrix composite material.

Different conduits could be used for retaining and releasing modifying agents having different functions or intended to be released at different times. For example, a first conduit could be used for formation of the pre-preg, and a second conduit for later self-repair. Still additional conduits could be used for desired qualities, such as optical sensing. In some embodiments, conduits may be present that retain no modifying agent, but act only as reinforcement or filler. In some embodiments, conduits or other fillers or fibers could be used to produce energy, such as heat.

By encasing the modifying agent in repair conduits, this self-repair system permits more efficient use of materials in the self-healing composite. In some applications, even a single repair conduit with modifying agent may be adequate for healing. In addition, by placing the modifying agent on specific surfaces, versus a dispersed second phase of homogenous modifying agent, this technique permits engineering of the self-healing reaction directly on the surfaces of reinforcement materials that might be present to further blunt or divert crack growth.

In some designs, second active agent, in addition to the modifying agent(s) and its reactant, could be added to the conduits, e.g., a 3-D system of conduits, to benefit the structure at a later time. It could be used to wet the conduits of the original structure and then also stay in the conduits to act as a self-repairing material at a later time.

In preferred embodiments, the modifying agent should be able to resist the high temperatures of the processing for formation and later heating, so that the composite can later self-repair. For example, such as when the composite is combined with a regular pre-preg which is processed at high temperatures of 250° F. and 350° F., such as for 1 to 2 hours at each temperature.

As an example, a laminate using pre-preg materials can be made with hollow conduits having a two-part modifying agent system with one component inside the repair conduit and the other on the outside, or a one-part modifying agent system with the component on the inside. The modifying agent can be activated by release from the inside the conduit to react with the chemical on the outside make a composite or to make a pre-preg for even later full activation. Additionally, after formation of the shaped article, an amount of the modifying agent may remain unreacted, available later for self-repair. Solvent may remain, waiting to be released from the conduit for later destruction and/or disposal of the article.

In some embodiments, a co-reactive component can be delivered or provided in the matrix which further reacts with by-products of a cure reaction of the modifying agent. For example, the heat of the initial curing reaction can activate a heat-activatable component to cause a secondary reaction. An example of such a self-forming matrix is a polymer ceramic composite, made by the following procedure. A mass of cement powder matrix, with appropriate sand and/or aggregate, is combined with a resin reactant, such as malic acid or maleic or succinic acid. A second part of the resin reactant, such as hexamethylene diamine, a liquid, is supplied in conduits. Upon rupture of the conduits, the modifying agent flows from the hollow conduit to the powders. The two resin reactants, i.e., the hexamethylene diamine and acid, react via polymer condensation reaction, forming nylon and a by-product, water. The resulting water hydrates the cement, forming concrete. Another example of such as self-forming matrix can include non-biological but biomimetic materials, wherein a polymer matrix containing crystallizable mineral elements such as alumina alkoxide may be provided. A condensation reactive element or ingredient provided inside the self-repair conduits may be released on application of appropriate external stimulus from the conduits within the matrix containing the alumina crystals. The by-product water of the condensation reaction in this case may be used to cause alumina crystals to grow at specified locations within the shaped article.

In various embodiments wherein the curable matrix composition contains at least one curable monomer, the modifying agent may be a reactive co-monomer, crosslinking agent, hardening agent, crosslinking catalyst, or a mixture of any of these which is capable of affecting the rate or participating in a cure reaction of each curable monomer.

Also, a one-part matrix component may be provided through some or all of the conduits. The one-part component permeates through the conduit walls and enters and optionally surrounds the matrix. The one-part component can be a simple adhesive, however, the one-part component preferably comprises a liquid compound, e.g., epoxy resin, containing a latent or inert catalyst component. This latent catalyst is activatable by a suitable external stimulus. For example, the latent hardener component may be a light-activatable photo-initiator stimulated by light, a heat-activatable component activatable by a heat source such as a laser, a radiation-activatable component activated by ultraviolet, electron beam, or gamma radiation. The external stimulus breaks down the inert, latent agent into activated catalyst to initiate curing. The latent catalyst or modifying agent may also be delivered through a conduit at a delaminated location or through a break in a conduit caused by a break or crack in the composite structure.

The conduits could thermally influence a matrix, such as during curing. It is recognized that some curing reactions such as polymerization can generate a substantial amount of heat. Particularly in conventional thick-section composite formations, heat is not efficiently dissipated and can build to excessive levels. If the heat exceeds the thermal stress limits of the matrix composition, the material can be damaged by cracking and weakening. Such damage may also result by uneven curing rates within the composite formation.

In some embodiments, the conduit is a conductor, such as metal, which can be charged by a voltage source in order to achieve a migration of ions through a curing composite structure. The metal conduits may have holes located in their walls to deliver initiator, repair, or thermal fluids.

6. Dynamic Matrix

The self-repair system, and especially the self-forming matrix, is provided by a series of chemical reactions to form a composite material in which a modifying agent, either a one-part or two-part system, is present as a fluid in a solid matrix. Upon damage, the solid is broken and the modifying agent(s) mix with the matrix, thus forming a solid or a fluid that then becomes a solid by a reaction. The purpose of the reaction is to repair damage such as cracks, voids, or delamination.

The self-repair systems of this disclosure provide a dynamic matrix material which is transformed by external forces (such as impact) in which the conduit and modifying agent are present within the matrix to repair the matrix or provide the matrix itself. The resulting matrix may react to any result caused by impact, such as chemical melting due to chemistry, heat causing flow, reaction, etc.

The dynamic self-repair system relies on a system of liquid flows, energy applications and response and chemical reactions in a synchronized way. The energy in the system, either chemical or physical movement, may come from any of the aspects involved, such as the force caused by the impact or fatigue, the breaking of the conduit, a coating on the conduit that initiates the formation of chemical energy, the modifying gent (which can be in several parts and in several locations such as in the repair conduits and throughout the matrix), inclusions in the matrix (such as optional beads or particles), the matrix itself, the interactions of various factors such as flow, the energy produced by flow, and the material properties themselves.

In other words, any aspect of the overall dynamic system may be responsible for the remedial, beneficial, or repair action such as (1) the force combined with the modifying agent, (2) the heat of the force combined with the modifying agent, (3) the chemistry of the matrix itself, (4) inclusions in the matrix, (5) excess reactivity in the matrix that reacts with the force, (6) modifying agent that reacts with heat, or (7) leftover modifying agent is activated by environmental intrusion (e.g., moisture). In general, the dynamic matrix material is transformed by external forces, either by formation of the matrix or repair of the matrix.

The self-repair system is a total three dimensional composite system that functions as a dynamic circulation system in at least one layer (for a laminate) or area (for a single layer composite). The interaction of the various components provides a system that functions on its own energy. The force of the damage to the composite creates a damaged space or void, such as a crack or delamination. This damaged area draws the modifying agent out of the conduit, acting as an impedance pump or providing suction. Also, the modifying agent flows out from the broken conduit. Heat may be created by the reaction of the modifying agent; the modifying agent stops moving when the damaged space is filled or there is no more pressure differential to push or pull it out of the conduit. The total system is one of created breaks in a composite or matrix, voids in the matrix, broken conduit and modifying agent flowing from the conduit and out into the damaged areas.

The self-repair system includes a total dynamic energetic circulation system that functions as an in situ fluidic system. The impact or fatigue energy or other energies are delivered to the composite or laminate to cause failure initiation energies which in turn cause damage evolution and failure in the composite structure. At the same time (in impact or fatigue) or subsequently (in fatigue), failure energies or cracking of the conduit or coating release the modifying agent and the energies act as a impedance pump, pushing out the modifying agent. Additionally, the void caused by the failure has an attractive force and the modifying agent flows into the void. The energy also either mixes two-part modifying agents, pushes the modifying agent to the matrix walls, or causes the modifying agent to react with the force alone or the force causes the modifying agent to react with particles or causes particles to react.

7. Magnetics and Radar Creating Energy

Figure 8:
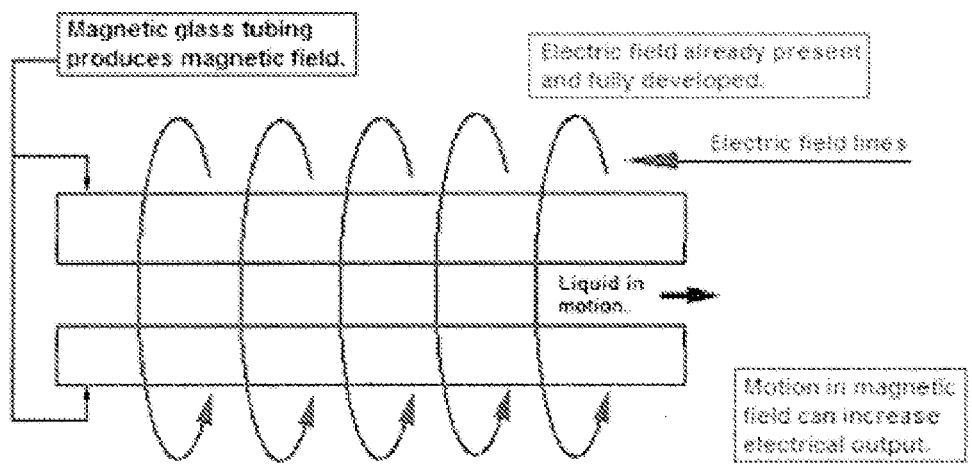
FIG. 8 is a schematic illustration of a repair conduit of a self-repairing system producing an electric field, which causes fluid to pump.
Figure 11:
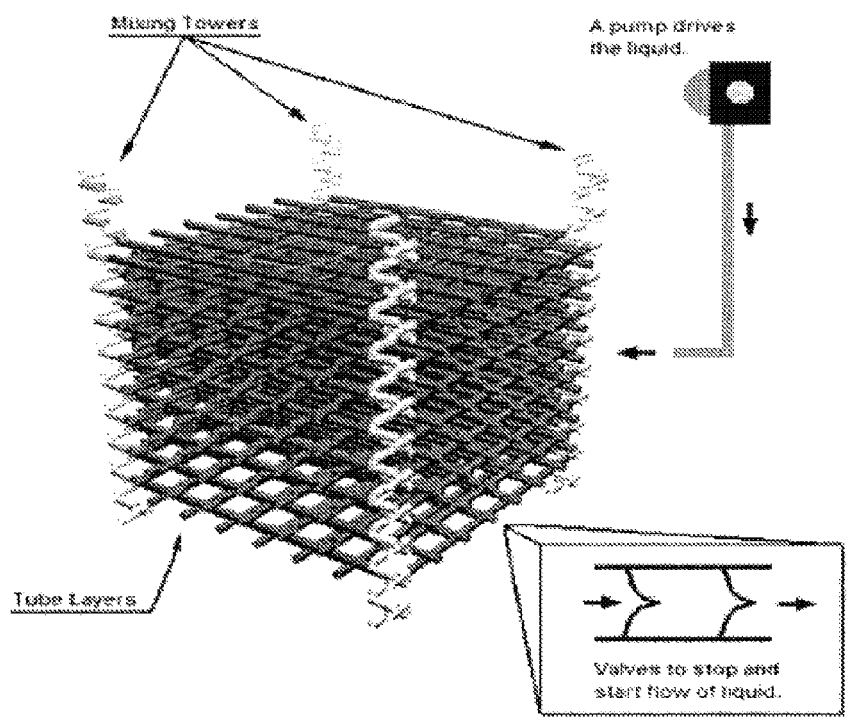
FIG. 11 is a schematic rendition of the prior art self-repair system having pumps and valves for moving the modifying agent therethrough, tubes in many layers and mixing towers.

To further increase the energy in the dynamic, self-repair system, the repair conduits or other elements of the system can be configured to, directly or indirectly, create electricity or other energy. The dynamic circulation system can have an adaptable energy producing self-repair system, which is caused by the flow of liquid (e.g., modifying agent) in a series of tubes (e.g., repair conduits). In some embodiments, electrically charged materials, moving inside of the conduits (e.g., glass or magnetic fibers), creates additional energy; the conduit, or the modifying agent itself may be charged or may carry charged particles. See, for example, FIG. 8. In other embodiments, in a magnetically charged conduit, the modifying agent within the conduit may include magnetically charged particles, such as glass beads, in the modifying agent to create circulation and energy. Ferrite particles may be used, which absorb radar energy and create heat. In some embodiments, the conduits may be metal, include metal inclusions, or have a metal coating thereon. Magnetic tubes and magnetic particles which are half of each polarity cause dielectric current production; see FIG. 9. The modifying agent can be driven around and out from the repair conduit with an electrical field applied to a magnetic field from the conduit.

Any of the materials may be designed to carry color, change color when electronic properties are sensed, or to release a secondary chemical. In some embodiments, the released modifying agent can provide an electronic signal to the matrix.

The creation of energy (e.g., electricity) or heat can then be used to provide further pumping of the modifying agent through the matrix. The motion of the modifying agent may then give rise to additional electrical production. The presence of conductive modifying agent released into a matrix, such as a carbon matrix, can be read as electrically conductivity matrix but with different resistivity than the matrix.

8. Pumps

A pump or series of pumps may be operably part of the conduit, typically to facilitate release from the conduit of the modifying agent. Examples of useable conduit pumps and/or their inclusion into the system follows. An impedance pump, which is really a hollow fluid containing tube which can be impacted to siphon modifying agent from one place to another when the conduit is sharply hit. Conduit pumps such as elastic balloon pumps, can be used to release the modifying agent into the damaged area under pressure, thus when the conduit breaks, the modifying agent comes out very quickly due to the pressure. Electronic pumps can be used; for example, a solution of hydrazine sulfate is driven by electrolysis to produce nitrogen and hydrogen (the mixing of the two chemical in a conduit would break the conduit and force the modifying agent out into the damaged area). Vapor pressure pumps utilize a propellant gas in one chamber which liquefies when compressed, and drives the modifying agent in the other part out into the damaged areas.

Figure 6:
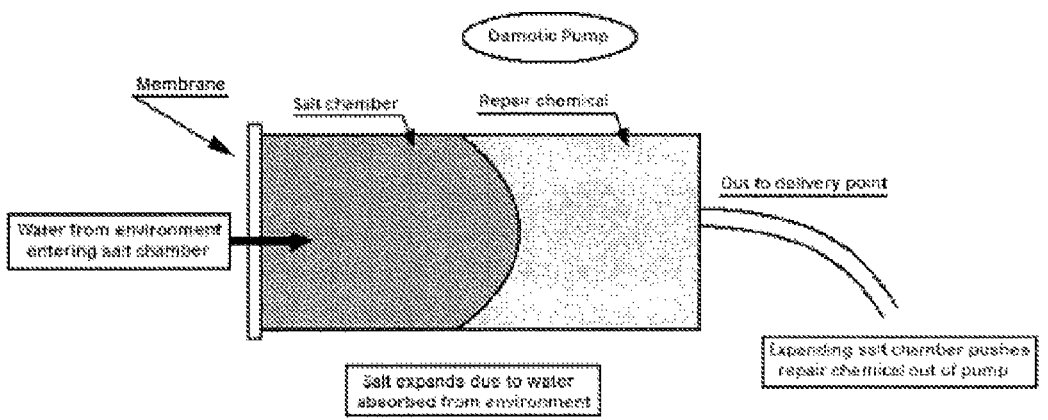
FIG. 6 is a schematic illustration of a first in situ osmotic pump formed by a repair conduit of a self-repairing system.
Figure 7:
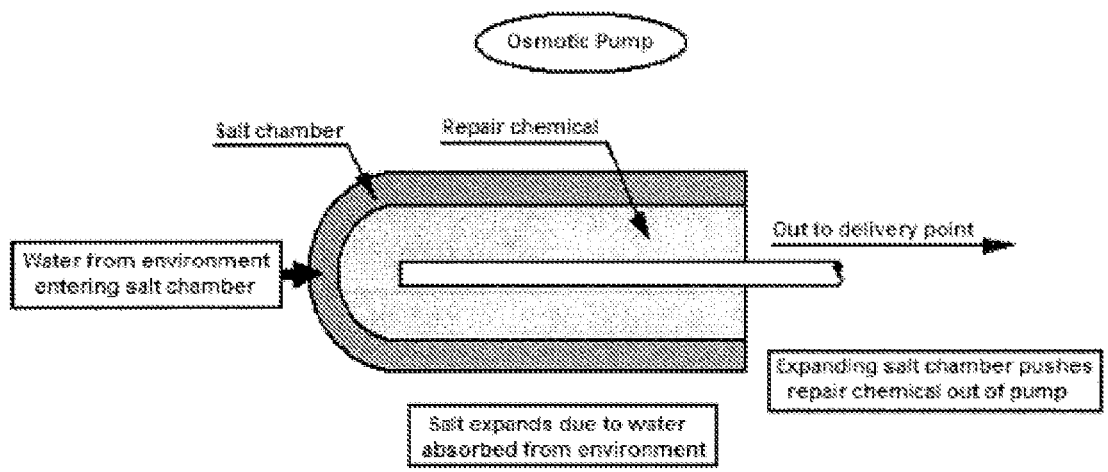
FIG. 7 is a schematic illustration of a second in situ osmotic pump formed by a repair conduit of a self-repairing system.

Osmotic pumps, which have two chambers, might be present in the system. See, for example, FIGS. 6 and 7, wherein one chamber retains modifying agent and a second chamber retains salt and is open to water. The water will flow into the salt chamber, swells in it, thus driving out the repair agent into the damage site. These are also known as Theeuwes pumps. A magnetic system, in which small magnetic beads are dispersed in the matrix, could be used. An oscillating magnetic field causes the beads to compress the matrix, opening channels through which the modifying agent is released into the damage areas. A simple pressure release phenomenon can also be used as a pump. In this case the repair chemical is inserted into the conduit under pressure.

9. Additives to Modifying Agent or Reagent

In some embodiments of self-repair systems, the modifying agent has been designed to withstand, without degradation, processing temperatures in a range from no heat to at least 250° C. for at least one hour, and, e.g., at least two hours. In some embodiments, the modifying agent is designed to withstand at least 300-350° F. for at least one hour and, e.g., at least two hours. To provide the high heat resistance to the modifying agent(s), various additives can be included to prevent damage during heating and to prevent over heating and/or boiling.

It was found that adding an amount of certain additives, at a level of at least about 1% to the modifying agent, provides improved heat resistance. Both one-part and two-part modifying agents benefit from these additives. Examples of suitable additives include cyclic organic sulfates, sulfites, sulfoxides, sulfinates, such as esters of sulfurous acid (e.g., 2-oxo-1,3,2-dioxathiolanes), hydroquinone, and antioxidants, e.g., phenolic antioxidant, such as butylated hydroxyanisole, including butylated hydroxyanisole (BHA; tert-butyl-4-hydroxyanisole) and butylated hydroxytoluene (BHT; 2,6-di-tert-butyl-p-cresol), and those antioxidants available under the trade designation IRGANOX. Hydroquinone and 2 ethyl hexyl methacrylate inhibit boiling of the modifying agent. In most designs, the level of the additive is between about 2-10%, and in some embodiments, about 4-8%.

Other additives could be added to the modifying agent to provide additional or alternate characteristics. For example, sulfur dioxide may be added to increase shelf life of the modifying agent (e.g., to 6 months), plasticizers may be added to inhibit the material obtained from becoming brittle. Chemicals which change color upon reaction could be added.

In some embodiments, it is preferred that the modifying agent is fast-acting, i.e., it reacts in less than one minute, and often, in less than 30 seconds. Various additives that may increase the reaction time of the modifying agent include silicon, styrene and alpha-methylstyrene, and bis-cyanoacrylate, and particles such as clay, nanoclays, montmorillite clay, and carbon black. NaOH, either as a 50% solution in water or as pellets could also be added to increase the reaction rate, e.g., for cyanates. Gases, e.g., ammonia, may increase reactivity. Additives could be added to increase the pressure within the modifying agent, thus forcing it out of the repair conduit quicker; these include triacetone triperoxide and butane. Some of these same additives may improve water resistance of the reacted product. Bis-cyanoacrylate may also increase the strength of the reacted product.

The additive may be added directly into the modifying agent(s), or, be provided in conduits or other sources proximate the modifying agent. Alternately, the conduit could have the additive or the modifying agent(s) on its surface.

According to the present disclosure, it is proposed to coat fibers with a modifying agent or other second modifying agent which can have a ROMP reaction and react more than once, or go on reacting past where it touches first. It is believed that coating conduits such as fibers with certain modifying agents can have a beneficial effect and produce a fast, efficient reaction but also could be used to create a pre-preg or composite material in one step with no mixing. Rather than being provided on the outside, the modifying agent could alternately be encapsulated, and only a small amount needs to be released to start the reaction with the modifying agent and formation of the resin. The components can later be activated for self-repair.

10. Various Features

The following lists provide various features such as ingredients for matrices, conduits, modifying agents, additives, etc. that can be used in any or all of the applications described in this disclosure. Also provided are different properties and characteristic of various features.

The damage forces that the systems of this disclosure can repair include: impact fatigue; cycling; thermal cycling creep. Also forces form processing such as inherent stresses can be damages which can be utilized later for repair.

The force of damage may be moderate, e.g., from 5 to 50 joules, may be high force (e.g., for graphite with tubes) to ballistic forces (e.g. if repair chemical in the matrix as a metal particle and uses heat or melting to flow). The velocity of the damage may occur at the speed of gravity to bullet speed. The damage itself may be delamination, cracking, fiber breakage, or buckling. The damage may be caused by one or multiple damaging events. The damage may be instantaneous or occur over several years, e.g., for fatigue, thermal cycling and creep which happens repeatedly over time.

The flow of the repair modifying agent out from the conduit could occur within a nanosecond (e.g., for a very thin material, e.g., 100-1000 centipoise) to several days.

The speed of complete chemical reaction, for the modifying agent, may be less than a week, less than a day, a few hours, less than a minute, or even less than 30 seconds. In some embodiments the speed of repair may be less than 1 second.

In general, for fiberglass laminates, the heat of processing is from ambient to 250° F., usually for at least one hour; for graphite laminates, the heat of processing is from ambient to 300-350° F., usually for at lest two hours. Either or both may be at pressure of 0 psi (total vacuum) to 10,000 psi. The preferred manufacturing of self repairing laminates may include vartm, scrimp, the use of an autoclave, manual or hand lay up, resin transfer molding, resin injection, etc.

For self-repair composite, the matrix may include polymer, pre-preg laminates, laminates, metal, metal-polymer, ceramic, glass, and even wood. The polymers can be thermosetting or thermoplastic materials. Polyetheretherketone (PEEK) and poly phenylene-ether (PPE) related polymer are examples. The composites could be processed at temperatures over 200° F., and as high as 300° F. Thermosetting materials can be processed at 250° F. for one hour and alternately or additionally at 300/350° F. for 2 hours. Some thermoset laminates are processed at 250° F. for one hour and alternately or additionally at 300/350° F. for 2 hours. Some thermoset laminates and polymers can be processed at 30-700° F. Usually, thermoplastics are processed up to 200° F., and can be processed at pressures of 40 to 10,00 psi.

Other matrices could be metals or aluminum foam with polymer infill that self repairs.

Numerous examples of repair chemicals or modifying agents have been provided above. Of course, these include epoxies, cyanate esters, cyanoacrylates and could include DCPD, Grubb's ruthenium, iron, tin, osmium, etc. These modifying agent need to survive the heat and pressure of processing, and in some designs, can remain reactive at minus 65 F, can repair damages from 2 to 60 joules of energy, can repair delamination of 1×1 to 2½ by 2½ inches by many layers deep, can move in 1 to 30 seconds and chemically react fast in less than 30 seconds.

Examples of useable epoxy resins include: e-05 CL Hysol; 608 Hysol; Hysol EA 9396 QT system; Resin lab EP1121 clear (Part B); Resin lab EP 750 clear (Part A); Ultra interior latex semi-gloss enamel; Epon Resin 828; Epoxy and fiber glass thinner; Bisphenol F-Epoxy resin (EPALLOY 8230); Resorcinol Diglycidyl ether (ERISYS RDGE); Epoxy phenol novalac resin (ERISYS RN-3650); Bisphenol F-epoxy resin (ERISYS RN-25); Epoxidized phenol-Novolac resin (ERISYS RF-50); Epon resin 8161; Epon resin 8021; Epon resin 8111; Fireban Hardener (NFC 2836); Fireban Resin; NFE-3038; NFE-2835; NFA-4822; NFA-3444; Fireban hardener (NFA 3140); Phenolic Novolac resin; and Epoxy novolac resin. For most, the difference between these epoxies and the commonly known epoxies is that these are formulated with Bis F or novolac epoxy resins (as compared to 'ordinary' Bis an epoxy resins). They provide an increase in chemical resistance as compared to the normal epoxies.

Examples of useable cyanate resin ester monomers include: 2,2-bis (4-cyanatophenyl) propane (Badcy); Aquafill 5003; Aquacore 1024; Aquapour 4015; Aquapour 1024; Aqua seal 3036; Aqua seal 3818; Aquacore premium 6001; Resbond 944; Luperox DHD-9; Resbond 940; and epoxy vinyl ester resin. These are highly innovative high-temperature, water-soluble mandrel materials.

Additional examples are: MY0150 resin; Trithanolamine; Resin beads; Urethane pour foam (PART A); Urethane pour foam (PART B); McLube 1725; Resbond 940 (Fast cure adhesive); and D.E.R 354 liquid epoxy resin.

Examples of suitable solvents, for missing of epoxies and other adhesives, include: acetone extra strength; glycerol 99% for high temp production; and Duratec Black recoating.

Example of aromatic amines that could be used include: Aradur 976-1 aromatic amine; and Two part Amine compound. Methylmethacyrlates, could be used, as could methacylic acid.

Some useable polymer chains cleave leaving hydrogen of poly phenylene-ether (PPE) related polymer composites, rebonding reaction proceeded at the chain ends with copper/amine complex added as a catalyst. Redox reaction for supplying oxygen continuously in the oxidation state of copper is changed from a mono-valent state to a di-valent state that was active for the re-combination reaction between chain ends in polymer.

Other chemicals for polymers self repair chemical include bistriazine, which reacts with tripehenol phosphenes in 15 minutes at room temperature, and cross-links at higher temperatures; resourcenol diglyceride ether mixes.

High temperature resistant materials, such as boron fibers, are suitable. $B_4C$ (boron carbide) in carbon composite, when it melts, oxidizes to $B_2O_3$ having a higher melting temperature. SiC which oxidizes into $SiO_2$ may also be suitable.

Various additives may be added for matrix strength. These have a good polar functionality hence can trap hydroxyls on their surfaces: Nanoclay, and carbon lampblack.

Heat producing chemicals may be added for heat production, potassium permanaganate, and a mixture of glycerin and potassium permanganate. Electrical wire may be physically inserted, such as for deicers on helicopters. Additives may be used that repair based on heat generated by the product—e.g., tires, computers The repair conduits, also sometimes referred to as tubes or fibers, could be fiberglass, cement, asphalt, hydroxyapatite, glass, ceramic, metal, polyolefin, polyester, polycarbonate, polyacrylate, polyarylate, polyamide, polyimide, polyaramide, polyurethane, carbon, graphite, cellulose, nitrocellulose, hydrocarbon, or piezoelectric material. Other examples include silicon glass tubes of 600 to 1200 micrometer outer diameter, boroslicate glass tubes, optical fibers from Polymicro Technologies, having an outer diameter of 60 to 1200 micrometers, silicon with polyimide or other polymer coatings, polyethylene tubes. Various processes could be done to treat the tubes.

The conduits or tubes could be nanofibers, electrospun nanotubular fibers, nanotubes, or hollow nanowhiskers. The nanofibers and like are sufficiently small enough so that no (or minimal) bumps are raised between pre-preg plies. Some fibers could be as small as 20-120 micrometers.

Some of the following features can be used for treating tubes (e.g., borosilicate) in order to reduce the curing rate of the modifying agent material therein, (e.g., cyanoacrylate): distilled white vinegar (e.g., overnight), muriatic acid, DL-maliec acid, dichloro, and dimethyl silane. These materials can be used for coating the glass tubes in order to make them hydrophobic and/or slippery. The tubes could be etched to make them more susceptible to breakage on impact.

The tubes, channels, fibers, or the like may be present as a weave of interconnected conduits. This weave could be designed to first carry the structure forming resins, resin infusion or scrimp, and then in the same channels carry self-repairing chemicals. The conduits could be used for secondary purposes, such as to carry light, energy or electricity.

Dyes or color changing indicators could be added to the matrix, modifying agent, or any additives. These include food colors, bromocresol purple, bromocresol green, bromothymol blue, sulforhodamine B, and cyanoacrylate that can indicate that it has reacted by a color change. Some cyanoacrylate changes color when reacted.

Any part of the composite may be configured to sense changes of one type or another. The composite may include nanotubes, carbon black, metal particles, reinforcements such as fibers, clay, carbon black, beads. The sensing may be based on visual change, energy release, eddy currents, energy differential, or the like.

Functionally gradient materials can be added anywhere within the composite. Functionally gradient materials can be thought of as spatially varied but produced by changes over time. To create gradient materials by changes during processing, they can be formed with fibers different from the pre-preg, by adding the variant fibers in between two non-zero bleed pre-preg layers to make an in-situ pre-preg layer. The bleeding of the resin during processing will form a prepare layer incorporating these fibers. Another way of making an in-situ laminate layer, in this case using different resin systems, is to lay in resin rods or a plaque which melt during processing and can fill in around dry fibers. These two in-situ ways of making pre-pregs with various resins and fiber contents will not disturb the manufacturing process and will allow the incorporation of various composite functionally graded properties.

The incorporation of the variant fibers needs a source of extra resin, either from the extra resin from other layers or additional resin from tubes or plaques. The variant resin needs fibers to attach to, either from the adjacent pre-preg layers or fibers. The combined system would consist of variant fibers or fiber performs set in a layer with a variant set of resin tubes or a plaque.

The particular application for development is for improved gradient thermal protection, oxidation protection, and impact strength property systems.

For some embodiments, e.g., self-forming systems, the following materials could be used: gydroxyapatite chemicals, (which are polymers that react with water forming hydroxyapatite bone structures or cement polymer composites), hydroxyapatite nanocrystals, and B-TCP hydroxyappetite nanocrystals. For ceramic/polymer self-forming structures, nylon polymer could be made with maleic acid and hexamethylene diamine. Succinic acid could also be used.

Uses force from processing inherent stresses for later release such as electrostatic charge in paint.

The systems of this disclosure provide various advantages for concrete systems. The adhesive is flexible itself and keeps on releasing with each brittle failure, i.e., crack. The ability to fill in for dimensional gaps with chemicals that foam, even with internally released stiff non-foaming adhesives, such as cyanoacrylates. The self-repair system can replace the tensile strength given by steel rebar. In full scale bridge applications, surface drying cracks can be avoided by creating in-situ control joints. The system can transform an entire structure into a ductile material, with energy dissipated all over as cracks form, and consequently, catastrophic failure, due to the enlargement of any one crack, would be prevented. The system helps prestressed members by re-bonding the tendons to the concrete, should any become debonded.

11. Examples

The following illustrative examples show that the modifying agent(s) survived high temperature processing (e.g., 250° F. processing for fiberglass and 300-350° F. processing for graphite laminates) and were still reactive after the exposure.

Two different modifying agents were used, epoxy and DERAKANE epoxy vinyl ester. The matrix used was a graphite epoxy made by Hexcel.

Thirty-two (32) plies of unidirectional carbon pre-preg were used and extra plies were added to level out the samples, i.e., to reduce any waviness caused by the addition of the repair tubes. The carbon pre-preg was cut to remove material to allow for tube placement in the center of the stack of pre-preg plies.

The 32 layers were stacked in a quasi-isotropic manner. After half (i.e., 16) of the layers were positioned, several filled conduit tubes were placed on top. For two-part adhesives, such as epoxy, twinned conduit tubes were placed next to each other. For a unidirectional laminate, the layout of the tubes was at 45 degrees to the pre-preg direction. Ten (10) pre-preg layers were cut to seat round the tubes, e.g., to level out the top of the tubs with the cut pre-preg layer. The other 16 plies were placed on top, so that 32 plies of pre-preg (plus 10 plies of pre-preg that had been cut) were combined to form the laminate.

The experimental graphite sample laminates, made with 32 plies of carbon pre-preg and 10 extra plies between the tubes, were made using conventional laminate forming procedures. The stack included a release ply, a perforated release ply, and bleeder cloth, with a vacuum bag with a central valve. The samples were autoclaved using a vacuum bag at temperature of 250° F. and 350° F. and a pressure of 40 psi with a curing ramp for 34 minutes to 250° F., then a 70 minute soak at 250° F., then a 22 minute ramp to 350° F. and a soak for 70 minutes and then finally cool to ambient temperature. The sample laminates were made as large pieces and then cut into smaller individual samples.

The control samples were similar laminates with no repair tubes or with empty tubes. Of course, the experimental samples had the repair tubes filled with modifying agent.

The samples were tested by impacting with 200 foot pounds of weight. The impacts ranges from 9 to 24 inches drop of a 20 pound weight in a Gardner impactor.

The samples were then tested in flexure or compression to failure in an Instron machine. The computerized results were normalized and the standard deviations studied and comparative result made. The difference between modulus on flexure of the control-no-tubes and the control-with-tubes provided any penalty for tube insertion into the pre-preg.

The comparison of the experimental samples to the control-no-tubes did not provide information regarding the overall repair value of the repair tubes. The comparison of the control-with-tubes to the experimental samples provided information regarding the strength contribution of the modifying agent. Results are provided below.

| Sample Category | Modulus in Flexure (msi) |
|---|---|
| Controls, no tubes, not impacted | 9.535 |
| Controls, no tubes, impacted (est. from other data) | 4.479 |
| DERAKANE, flexed 1 day after impact | 4.86 |
| DERAKANE, flexed 5 days after impact | 5.78 |
| DERAKANE, flexed 9 days after impact | 8.425 |
| Epoxy, flexed 5 days after impact | 7.2 |
| Epoxy, flexed 9 days after impact | 7.19 |

In fiberglass samples, a visual inspection with light penetrating through the samples was done using a dyed modifying agent for easier identification of the damaged area. In graphite samples, the laminate was pulled apart to assess the size of the delamination and the spread of the modifying agent.

The samples that used epoxy as the modifying agent, the results were acceptable. In examples using DERAKANE as the modifying agent, these samples did not withstand the high temperatures of processing.

In subsequent tests, the DERAKANE was added to the tubes after the heat processing of the laminate; i.e., the DERAKANE was added to open ended tubes. The samples were processed as above but the open ended tubes were plugged during the heating process so as to not take in resin flowing during the processing. After heating, the tube ends were unplugged and filled with DERAKANE by a syringe pressure set up.

Although the DERAKANE modifying agent was not able to withstand the high temperatures in this experiment, DERAKANE modifying agent is valuable in that it can gain strength earlier than the epoxy type reaction, which required time for diffusion, even though the epoxy has a higher ultimate strength. Additionally, in these examples, the DERAKANE epoxy vinyl ester provided a higher repair yield than epoxy, about 88% compared to 74%, but both of which are acceptable.

The following illustrative examples show that doubling the number of repair tubes present in the laminate (e.g., in the top and bottom plies), restored damaged areas properties better than single sets.

Samples were made in same way as above except twinned repair tubes with a two-part epoxy (i.e., one part in each tube) were placed two layers from the top and two layers from the bottom of the stack of 32 pre-preg sheets. The tubes were placed along the exterior edges of the stack.

With double layers of repair tubes, after impact, the repaired laminate had a modulus 300% higher than the impacted controls. It was estimated that the impacted control was 50% of the non impacted one, the non impacted control would be 4.2 msi and repaired samples would have a 40% higher modulus than the undamaged control for a repair value of 140%.

General conclusions reached for graphite laminate composites were:

1. The repair system had no effect on the laminate, i.e. a thick sample with the embedded glass tubes in the neutral axis behaves the same as one without tubes, in modulus and in flexure.

2. The repair system works, i.e. stiffness is lost after impact and the stiffness is greatly restored as a result of the release of repair agent.

Although several different matrix materials have been disclosed or suggested herein, others may still be used by those skilled in this art. Although a number of different kinds of fibers have also been described, still other fibers might also be used by those skilled in this art in accordance with the principles of this invention. Different modifying agents and different mechanisms for selective release of the modifying agent in response to an external stimuli or internal stresses caused by other external occurrences might also be developed and designed by those skilled in the art given the principles provided herein. Accordingly, all such obvious modifications may be made herein without departing from the scope and spirit of the present invention as defined by the appended claims.

I claim:

1. A laminate composite comprising:
   a matrix;
   at least two plies of graphite material; and
   at least one self-repair conduit disposed between the at least two plies of graphite material, the self-repair conduit having therein a reactive modifying agent that, when exposed to a temperature of at least 300° F. for at least one hour, remains reactive.

2. The laminate of claim 1, wherein the composite comprises at least 24 plies of graphite material.

3. The laminate of claim 2, wherein the composite comprises from 24 to 32 plies of graphite material.

4. The laminate of claim 1, wherein the reactive modifying agent, when exposed to a temperature of at least 350° F. for at least one hour, remains reactive.

5. The laminate of claim 4, wherein the modifying agent, when exposed to a temperature of at least 350° F. for at least two hours, remains reactive.

6. The laminate of claim 1, further comprising a second conduit having therein a reagent for the modifying agent.

7. The laminate of claim 1, wherein the self-repair conduit comprises a glass fiber.

8. The laminate of claim 1, wherein the self-repair conduit is a channel defined by the matrix.

9. The laminate of claim 1, further comprising a reagent for the modifying agent.

10. The laminate of claim 9, wherein the reagent for the reactive modifying agent is present in the matrix.

11. The laminate of claim 9, wherein the reagent for the modifying agent is present in a second conduit.

12. The laminate of claim 1, wherein the modifying agent reacts in less than one minute after release from the conduit.

13. The laminate of claim 12, wherein the modifying agent reacts in less than 30 seconds after release from the conduit.

14. The laminate of claim 1, wherein the modifying agent repairs the laminate after an impact of from 5 joules to 50 joules to the laminate, the repair resulting in a laminate having at least 80% of the strength the laminate had prior to the impact.

15. An article comprising:
a conduit comprising a surrounding wall defining a volume; and
a reactive modifying agent sealed in the volume, the reactive modifying agent, when exposed to a temperature of at least 300° F. for at least one hour, remains reactive.

16. The article of claim 15, wherein the modifying agent further comprises a color-change additive.

17. The article of claim 15, wherein after reaction of the modifying agent, the reacted modifying agent resists a temperature of at least 250° F. for at least one hour without degradation.

18. The article of claim 17, wherein the modifying agent repairs damage to a composite from an impact of from 5 joules to 50 joules, the repair resulting in a composite having at least 70% of the strength the composite had prior to the impact.

19. The article of claim 18, wherein the modifying agent repairs damage to a composite from an impact of from 5 joules to 50 joules, the repair resulting in a composite having at least 80% the strength the composite had prior to the impact.

20. The article of claim 15, wherein the modifying agent reacts by one of ROMP (ring-opening metathesis polymerization), Bergman cyclization, Dehls Alder, and Shrock chemistry.

21. A self-repair system for a composite comprising:
a matrix; and
at least one first conduit having retained therein a reactive modifying agent that, in response to an external stimulus, releases from the at least one first conduit and flows in the matrix,
the reactive modifying agent, when exposed to a temperature of at least 300° F. for a period of one hour, remains reactive.

22. The self-repair system of claim 21, wherein the composite is a laminate.

23. The self-repair system of claim 21, wherein the at least one first conduit comprises nanofibers, electrospun nanotubular fibers, nanotubes, hollow nanowhiskers, fiberglass, cement, asphalt, hydroxyapatite, glass, ceramic, metal, polyolefin, polyester, polycarbonate, polyacrylate, polyarylate, polyamide, polyimide, polyaramide, polyurethane, carbon, graphite, cellulose, nitrocellulose, hydrocarbon, or piezoelectric material.

24. The self-repair system of claim 21, wherein the modifying agent reacts with a reagent present in the matrix.

25. The self-repair system of claim 21 further comprising a second conduit comprising a reagent, the modifying agent reacting with the reagent present in the second conduit when the reagent is released from the second conduit and the modifying agent is released from the first conduit.

26. The self-repair system of claim 25, wherein the at least one first conduit and the second conduit are next to each other.

27. The self-repair system of claim 26, wherein the at least one first conduit and the second conduit are intertwined or twisted.

28. A self-repairing article comprising:
a composite;
a conduit disposed in the composite, the conduit comprising a surrounding wall defining an internal volume; and
a reactive agent disposed in the internal volume of the conduit, the reactive agent, when exposed to a temperature of at least 300° F. for a period of one hour, remains reactive.

29. The article of claim 28, wherein the conduit comprises a capillary channel, a hollow bead, a hollow optical fiber, tube, pipette, carbon fiber, straw, or a combination thereof.

30. The article of claim 28, wherein the composite comprises a laminate comprising multiple layers, the conduit being disposed between at least two layers of the laminate.

31. The article of claim 28, wherein the composite comprises a matrix, the conduit being disposed within the matrix.

32. The article of claim 28, wherein the conduit releases the reactive agent when exposed to a sufficient external stimulus.

33. The article of claim 28, wherein the reactive agent comprises at least one of an acrylate, alkyl acrylate, methylmethacrylate, cyanoacrylate, acrylic acid, alkyl acrylic acid, olefin, lactone, lactam, styrene, isoprene, butadiene, urethane, and epoxy.

34. The article of claim 28 further comprising an additive disposed in the internal volume of the conduit, the, additive selected from the group consisting of a cyclic organic sulfate, sulfite, sulfoxide, sulfinate, hydroquinone, antioxidant, butylated hydroxyanisole, butylated hydroxytoluene, 2-ethylhexyl methacrylate, sulfur dioxide, triacetone triperoxide, butane, silicon, sodium hydroxide, catalyst, initiator, diol, diamine, amine, nanotubes, UV stabilizer, heat stabilizer, flame retardant, colorant, anticorrosion chemical, anti-freeze material, antimicrobial, odorant, surface-modifying additive, plasticizer, viscosity modifier, and combinations thereof.

35. The article of claim 28, wherein the conduit is a glass tube.

36. The article of claim 35, wherein the tube is treated with at least one of muriatic acid, maleic acid, acetic acid, dichloro silane, and dimethyl silane.

37. The article of claim 28 further comprising a second conduit, wherein the reactive agent comprises a first part and a second part, the first part being disposed in the first conduit and the second part being disposed in the second conduit.

38. The article of claim 37, wherein
the first part comprises
at least one of an acrylate, cyanoacrylate, alkyl acrylate, methyl methacrylate, acrylic acid, alkyl acrylic acid, olefin, lactone, lactam, styrene, isoprene, butadiene, urethane, epoxy vinyl ester, and epoxy, and,
optionally, at least one of cyclic organic sulfate, sulfite, sulfoxide, sulfinate, hydroquinone, antioxidant, butylated hyroxyanisole, butylated hydroxytoluene, 2-ethylhexyl methacrylate, sulfur dioxide, triacetone triperoxide, butane, silicon, nanotubes, and
the second part comprises at least one of methyl methacrylate, nanoclays, an alkaline compound, catalyst, initiator, diol, diamine, and amine, the second part being different from the first part.

39. The article of claim 28, wherein the conduit comprises beads comprising at least one of an epoxy and a cyanoacrylate.

40. The article of claim 28, wherein the composite comprises a cementitious material.

41. The article of claim 28, wherein the composite comprises a polymer matrix.

42. The article of claim 28, wherein the composite comprises an elastomer matrix.

43. The article of claim 42, wherein the reactive agent comprises at least one of epoxy and cyanoacrylate.

44. The article of claim 43 further comprising an additive disposed in the conduit, the additive being selected from the group consisting of a cyclic organic sulfate, sulfite, sulfoxide, sulfinate, hydroquinone, antioxidant, butylated hyroxyanisole, butylated hydroxytoluene, 2-ethylhexyl methacrylate, sulfur dioxide, triacetone triperoxide, butane, silicon, sodium hydroxide, catalyst, initiator, diol, diamine, amine, nanotubes, and combinations thereof.

45. The article of claim 28, wherein the composite comprises layers comprising elastomers and layers comprising a plurality of the conduits, the conduits being in the foam of tubes, the reactive agent being disposed in the tubes.

46. The article of claim 45, wherein the tubes comprise at least one of polymer and metal.

47. A method of making the laminate composite of claim 1, wherein the self-repair conduit is a glass conduit, the method comprising:
    treating the glass conduit with at least one of muriatic acid, maleic acid, acetic acid, dichloro silane, and dimethyl silane,
    filling the conduit with a reactive agent;
    sealing the conduit;
    disposing the treated and filled conduit in the matrix to form the composite; and
    processing the composite, the processing comprising at least one of heating and applying a vacuum.

48. The method of claim 47, wherein the heating comprises exposing the composite to a temperature of greater than 200° F. for at least one hour.

49. The method of claim 47 further comprising applying a vacuum while heating the composite.

50. The method of claim 47, wherein the matrix comprises a polymer.

51. The method of claim 47, wherein the reactive agent comprises at least one of an acrylate, alkyl acrylate, methyl methacrylate, cyanoacrylate, acrylic acid, alkyl acrylic acid, olefin, lactone, lactam, styrene, isoprene, butadiene, and epoxy.

52. The method of claim 47, wherein the reactive agent comprises
    at least one of an epoxy, epoxy vinyl ester, urethane, and cyanoacrylate, and
    at least one of butylated hydroxyanisole, butylated hydroxytoluene, 2-ethylhexyl methacrylate, methylmethacrylate, organic sulfate, sulfite, sulfoxide, sulfinate, hydroquinone, and sulfur dioxide.

53. The method of claim 47 further comprising an additive disposed in the conduit, the additive being selected from the group consisting of cyclic organic sulfate, sulfite, sulfoxide, sulfinate, hydroquinone, butylated hydroxyanisole, butylated hydroxytoluene, methylmethacrylate, nanotubes, and combinations thereof.

* * * * *